(12) United States Patent
Ang et al.

(10) Patent No.: US 7,609,682 B2
(45) Date of Patent: Oct. 27, 2009

(54) IMPLEMENTING AN INTELLIGENT NETWORK SERVICE FOR A PACKET-SWITCHED SERVICE USING A NODE INTERFACING A MOBILE COMMUNICATIONS NETWORK TO A PACKET DATA NETWORK

(75) Inventors: Soon Teck Gibson Ang, Nashua, NH (US); Thierry Van de Velde, Brussels (BE); Jie Feng, Rolling Meadows, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 817 days.

(21) Appl. No.: 10/161,210

(22) Filed: Jun. 3, 2002

(65) Prior Publication Data

US 2003/0031160 A1 Feb. 13, 2003

Related U.S. Application Data

(60) Provisional application No. 60/295,453, filed on Jun. 1, 2001, provisional application No. 60/344,538, filed on Oct. 19, 2001, provisional application No. 60/357,940, filed on Feb. 18, 2002.

(51) Int. Cl.
*H04J 3/24* (2006.01)
(52) U.S. Cl. .................................. 370/349; 370/338
(58) Field of Classification Search ................. 370/349, 370/338, 352; 455/432.1, 433, 406, 407, 455/408
See application file for complete search history.

(56) References Cited

U.S. PATENT DOCUMENTS 4,706,275 A 11/1987 Kamil 4,977,594 A 12/1990 Shear (Continued)

FOREIGN PATENT DOCUMENTS

CA 2250673 A 4/1999

(Continued)

OTHER PUBLICATIONS

WaterCove Networks, "Exploiting the Opportunities for Personalized Mobile Data Services", White Paper, Feb. 2002, pp. 1-11.

(Continued)

*Primary Examiner*—Brian D Nguyen
(74) *Attorney, Agent, or Firm*—Sughrue Mion, PLLC

(57) ABSTRACT

A module interfaces a mobile communications network to a packet data network and is capable of implementing an Intelligent Network Service for a packet-switched service for subscribers of the mobile communications network. A network interface module may be operative to implement such prepaid charging in real-time. The network interface module may determine both a count and a time period from the prepaid balance, and compare the number of information units exchanged during the service and the duration of the service against the count and time period, respectively. An entry for a subscriber in a Subscriber Information Registry of a home mobile communications network may be defined such that when a subscriber roams into a visited mobile communications network, the network interface module of the home mobile communications network is used to implement a session between the mobile terminal of the subscriber and a node of a packet data network.

68 Claims, 10 Drawing Sheets

U.S. PATENT DOCUMENTS

| | | | |
|---|---|---|---|
| 5,572,583 | A | 11/1996 | Wheeler, Jr. et al. |
| 5,717,923 | A | 2/1998 | Dedrick |
| 5,722,067 | A | 2/1998 | Fougnies et al. |
| 5,742,905 | A | 4/1998 | Pepe et al. |
| 5,812,533 | A | 9/1998 | Cox et al. |
| 5,857,020 | A | 1/1999 | Peterson, Jr. |
| 5,881,239 | A | 3/1999 | Desgrousilliers |
| 6,104,803 | A | 8/2000 | Weser et al. |
| 6,141,754 | A | 10/2000 | Choy |
| 6,199,054 | B1 | 3/2001 | Khan et al. |
| 6,253,193 | B1 | 6/2001 | Ginter et al. |
| 6,301,472 | B1 | 10/2001 | Nakasu et al. |
| 6,335,968 | B1* | 1/2002 | Malik ................. 379/114.2 |
| 6,373,930 | B1 | 4/2002 | McConnell et al. |
| 6,460,023 | B1 | 10/2002 | Bean et al. |
| 6,496,690 | B1* | 12/2002 | Cobo et al. ................. 455/408 |
| 6,574,201 | B1 | 6/2003 | Kreppel |
| 6,975,850 | B1* | 12/2005 | Hurtta et al. ................. 455/405 |
| 6,975,852 | B1* | 12/2005 | Sofer et al. ................. 455/408 |
| 6,985,446 | B1* | 1/2006 | Hurtta et al. ................. 370/249 |
| 7,171,189 | B2* | 1/2007 | Bianconi et al. ............ 455/408 |
| 2002/0068545 | A1 | 6/2002 | Oyama et al. |
| 2002/0102962 | A1* | 8/2002 | Grinn et al. ................. 455/406 |
| 2002/0133457 | A1* | 9/2002 | Gerlach et al. ................. 705/39 |
| 2002/0167909 | A1* | 11/2002 | Balazinski et al. .......... 370/252 |
| 2002/0174212 | A1* | 11/2002 | Casati et al. ................. 709/223 |
| 2002/0176377 | A1 | 11/2002 | Hamilton |
| 2002/0176378 | A1 | 11/2002 | Hamilton et al. |
| 2003/0165222 | A1* | 9/2003 | Syrjala et al. .......... 379/114.26 |
| 2003/0193933 | A1* | 10/2003 | Jonas et al. ................. 370/352 |

FOREIGN PATENT DOCUMENTS

| | | |
|---|---|---|
| DE | 198 49 540 A1 | 1/2000 |
| DE | 100 10 885 A1 | 9/2001 |
| WO | WO 98/30013 | 7/1998 |
| WO | 99/37103 A1 | 7/1999 |
| WO | 00/24209 A1 | 4/2000 |
| WO | WO 00/56085 A | 9/2000 |
| WO | 01/30030 A1 | 4/2001 |
| WO | WO 01/63883 | 8/2001 |
| WO | WO 02/12976 A2 | 2/2002 |

OTHER PUBLICATIONS

WaterCove Networks, "What's all the Fuss About Metering?", White Paper, Feb. 2002, pp. 1-10.

WaterCove Networks, "Purpose-Built Architecture Required for Mass-Market Deployment of Personalized Data Services", White Paper, Feb. 2002, pp. 1-11.

International Search Report from corresponding PCT patent application No. PCT/US02/17477, dated Jun. 3, 2002.

U.S. Appl. No. 60/292,564, Cavenett, et al.

U.S. Appl. No. 60/293,756, Cavenett, et al.

* cited by examiner

IMPLEMENTING AN INTELLIGENT NETWORK SERVICE FOR A PACKET-SWITCHED SERVICE USING A NODE INTERFACING A MOBILE COMMUNICATIONS NETWORK TO A PACKET DATA NETWORK

RELATED APPLICATIONS

This application claims the benefit under 35 U.S.C. §119 (a) to commonly-owned U.S. provisional patent application Ser. No. 60/295,453, entitled Media Insensitive, Real Time, Low Balance Threshold Notification and Processing Mechanism (aka the "TOP UP, POP UP"), filed Jun. 1, 2001, U.S. provisional patent application Ser. No. 60/344,538, entitled Implementing an Intelligent Network Service for a Packet-Switched Service Using a Node Interfacing a Mobile Communications Network to a Packet Data Network, filed on Oct. 19, 2001, and U.S. provisional patent application Ser. No. 60/357,940, entitled Implementing an Intelligent Network Service for a Packet-Switched Service Using a Node Interfacing a Mobile Communications Network to a Packet Data Network, filed on Feb. 18, 2002, each of which is incorporated herein by reference in its entirety.

Commonly-owned U.S. patent application entitled Enabling a Subscriber to a Multi-Media Service on a Communications Network an Opportunity to Add Value to a Prepaid Account for the Service While Providing the Service to the Subscriber, filed herewith under PCT/US02/17492 (the Tubinis application) is incorporated herein by reference in its entirety.

FIELD OF INVENTION

The present disclosure relates generally to the field of communications networks and more specifically to providing Intelligent Network Services (e.g., real-time prepaid charging) for such packet-switched services on a communications network, for example, a mobile communications network.

DESCRIPTION OF THE RELATED ART

Mobile (i.e., wireless) communications networks (MCNs) (mobile telecommunications networks, mobile data communications networks and combinations thereof) are having a growing impact on the communications industry. In addition to enabling communication services to be provided by service providers, operators of MCNs often provide Intelligent Network Services (INSs), for example, prepaid charging, for their subscribers as well.

There are several types of MCNs, as well as several types of MCN network elements, technologies and configurations. For a better understanding of the problems and solutions set forth below, these several types of MCNs, network elements, technologies and configurations will now be described.

Mobile Communications Networks

As used herein, a "mobile communications network" or "MCN" is a communications network including a plurality of network resources that enable wireless communications between two or more of the plurality of network resources. As used herein, "plurality" means two or more. MCNs are often referred to as Public Land Mobile Networks (PLMNs). Several types of MCNs are known, and some are in use today, including Global System for Mobile communications (GSM), General Packet Radio Service (GPRS), Universal Mobile Telecommunications System (UMTS), a plurality of types of Code-Division Multiple Access-based communications networks (e.g., cdmaOne, cdma2000, etc.), Wireless Personal Area Networks (PANs), for example, Bluetooth or a wireless PAN in accordance with IEEE 802.15, and Wireless Local Area Networks (WLANs), for example, HiperLan 2 or a WLAN in accordance with IEEE 802.11 (e.g., 802.11b (Wi-Fi), 802.11a and 802.11g).

GPRS originally was developed and is often implemented as an add-on to existing GSM networks. Thus, a GSM network and a GPRS network are often part of an MCN referred to herein as a GSM/GPRS network. GSM, often referred to as a $2^{nd}$ Generation or 2G network, is described in more detail in: *3rd Generation Partnership Project Technical Specification Group Services and System Aspects, Digital cellular telecommunications system (Phase 2+), GSM Release 1999 Specifications (3GPP TS 01.01)*, the entire contents of which are hereby incorporated by reference.

The $3^{rd}$ Generation Partnership Project (3GPP) specifies European-centric mobile communication standards such as GPRS and UMTS. The $3^{rd}$ Generation Partnership Project II (3GPP2) is an organization that specifies more US-centric mobile communications standards such as CDMA 2000 standards.

GPRS, often referred to as a 2.5G network, is described in more detail in: *$3^{rd}$ Generation Partnership Project, Technical Specification Group Services and System Aspects, Digital cellular telecommunications system (Phase 2+), General Packet Radio Service (GPRS), Service description, Stage 2, Release 1998 (3GPP TS 03.60)*, the entire contents of which are hereby incorporated by reference.

UMTS, often referred to as a $3^{rd}$ Generation or 3G network, is described in technical specifications published by the 3rd Generation Partnership Project, including *3GPP TS 23.101*, whereas packet-switched services of UMTS are described in 3GPP TS 23.060. The entire contents of 3GPP TS 23.101 and 3GPP TS 23.060 are each being hereby incorporated by reference.

CdmaOne, often referred to as a 2.5G network, is described in more detail in: *ANSI/Telecommunications Industry Association (TIA)/EIA-95-A and 95-B Standard, Mobile Station-Base Station Compatibility Standard for Wideband Spread Spectrum Cellular Systems, ANSI/TIA/EIA-41-C and 41-D Standard, Cellular Radiotelecommunications Intersystem Operations*, the entire contents of which are hereby incorporated by reference.

Cdma2000 is described in more detail in technical specifications published by the 3rd Generation Partnership Project II, including *A.S0001-A 3GPP2, Access Network Interfaces Interoperability Specification-Release A*, the entire contents of which is hereby incorporated by reference.

Some MCNs only are capable of implementing circuit-switched voice services. As used herein, a "circuit-switched voice service" is a voice service, for example, plain old telephone service (POTS), implemented using circuit-switched communications (analog or digital). As used herein, a "circuit-switched voice communication" is a communication including voice content that is transmitted along a network path (i.e., a connection or circuit) established between two endpoints for which a portion of bandwidth (e.g., a time slot) of each link along the path is exclusively reserved for a duration of the connection. All communications transmitted from one endpoint to the other endpoint travel the same path across the network defined for the connection, which is established before communications begin. For example, for a telephone call, a connection is established between at least two parties and reserved for a duration of the call. Typically, after a connection has been established, circuit-switched voice communications include a connection identifier and a destination identifier (e.g., telephone number) from which network nodes determine where to route (i.e., switch) the communication. A Public Switched Telephone Network (PSTN) is an example of a communications network that provides circuit-switched voice services. A GSM network is an example of an MCN that provides circuit-switched voice services.

Other MCNs are capable of implementing packet-switched services in addition to or as an alternative to circuit-switched voice services. As used herein, a "packet-switched service" is a service implemented using packet-switched communications, for example, an Internet access service provided by an Internet Service Provider (ISP).

As used herein, a "packet-switched communication" is a communication transmitted between two nodes of a communications network using packet-switching, where the communication comprises one or more packets. As used herein, a "session" is a logical relationship established between at least two network entities for a period of time. As used herein, a "packet" is a unit of information exchanged between modules of a communications network, where such modules may reside on a same or different node of the communications network. As used herein, to "exchange" means to transmit and/or receive. Packets are often referred to as "frames" in the network communications industry. Using packet-switching, each packet exchanged between the two nodes may travel a different path across the network and may encapsulate any of a variety of media content, including audio (e.g., voice), video, and data, or combinations thereof. Using packet-switching, each packet of a packet-switched communication may include a source identifier (e.g., IP address) and a destination identifier (e.g., IP address) from which network nodes determine where to route or switch each packet of the communication. A Local Area Network (LAN) is an example of a communications network that can provide packet-switched services. A GPRS network is an example of an MCN that can provide packet-switched services.

As used herein, a "user terminal" is a communication device that serves as an endpoint in a communications network and at which communications may terminate and/or originate. Some examples of user terminals include work stations, PCs, laptops, telephones, pagers, Blackberry™ brand devices, PCS devices, personal digital assistants (PDAs), etc.

As used herein, a "mobile terminal" or "MT" is a user terminal capable of communicating (i.e., receiving and/or transmitting communications) with other network resources through an air interface (i.e., using a carrier wave).

As used herein, a "mobile subscriber" or "subscriber" is a user of an MT who subscribes to one or more services provided by an operator of an MCN.

FIG. 1 is a block diagram illustrating a communications network 1 that includes at least MCNs 2 and 4, one or more packet data networks (PDNs) 6, a public switched telephone network (PSTN) 8 and one or more other communications networks 10, which each can be any of a variety of types of communications networks. A PDN may be any communications network capable of communicating information encapsulated in packets, for example, an Internet Protocol-based (IP-based) network, an X.25-based network, or an Asynchronous Transfer Mode (ATM) network.

The MCN 2 may include one or more MTs 18 configured to communicate with a wireless access sub-network (WAS), for example, a Base Station Subsystem (BSS) of a GSM, GPRS or UMTS network or a Radio Access Network (RAN) of a CDMA-based network. The MCN 2 may include one or more WASs 12 that are each interfaced to a network services sub-network (NSS) 10 of the MCN 2.

FIG. 2 illustrates a WAS 12 of an MCN 2 in more detail. A WAS 12 provides the radio link between an MT and an NSS. A WAS 12 may include any of one or more wireless access portals (WAPs) 30, for example, a Base Transceiver Station (BTS) and radio tower of a BSS or a RAN. A WAP 30 may include one or more radio transceivers. In a typical MCN, a range of a transceiver defines a cell. A WAP 30 handles the radio-link protocols for communication with an MT.

Each of the one or more WAPs 30 may be connected to a wireless access sub-network controller (WASC), for example, a Base Station Controller (BSC) of a BSS or a Radio Network Controller (RNC) of a RAN. The WASC 32 manages the radio resources for one or more WAPs 30. For example, the WASC may handle radio-channel set up, frequency hopping, and handoffs between WAPs. The WASC serves as a logical interface between an MT and one or more switching modules of the NSS 10.

The WASC 32 may be configured to discriminate between packet-switched communications and circuit-switched communications. The WASC 32 may include a packet control unit (PCU) 33 that enables the WASC 32 to handle packet-switched communications and route them to packet-switching module (PSM) 36 of NSS 10, whereas circuit-switched voice communications are routed to circuit-switching module (CSM) 34.

Network Services Sub-network of a Mobile Communications Network

FIG. 3 illustrates the NSS 10 of MCN 2 in more detail. A typical NSS 10 performs the switching of communications between subscribers of the MCN 2 and between a subscriber of the MCN 2 and a network resource on another network (e.g., another MCN 4, a PDN 6, a PSTN 8 or another communications network 10). The NSS 10 also may handle the mobility management operations for the MCN 2 and provide a variety of other services. The NSS 10 may include any of one or more CSMs 34A, one or more PSMs 36A, one or more PDN Interface Modules (PIMs) 44A and 46B, one or more Service Control Function (SCF) modules 48, one or more subscriber information registers (SIRs) 50, one or more charging gateways 45 and one or more billing systems 47.

An NSS (e.g., NSS 10) that includes both a CSM and a PSM enables subscribers to have access to both circuit-switched voice services and packet-switched services. For example, if the NSS 10 is part of a GSM/GPRS network, one or more of the CSMs may be a Mobile Switching Center (MSC) that may include a Visitor Location Register (VLR), and the PSM may be a Serving GPRS Support Function (SGSF) module. The SGSF module may be implemented on a Serving General Packet Radio Service Support module (SGSN) of the GPRS network, or may be implemented on a General Packet Radio Service Support module (GSN) that also may include a Gateway GPRS Support Function (GGSF) module.

Alternatively, if the NSS 10 is part of a GSM network that implements only circuit-switched voice services, the NSS 10 may not include any PSMs, but may include one or more MSCs that each may include a (Visitor Location Register) VLR.

The switching modules (CSMs and PSMs) may provide a variety of services for the NSS, including registration of subscribers, authentication, ciphering, location updating (of subscribers), handoffs between WASCs and switching. For example, the switching nodes may switch communications, originating from an MT and received from a WASC, to an appropriate destination, for example, another WASC, another module or node of the NSS 10, a node of another MCN 4, a PIM (e.g., 44A, 44B) for interfacing to a PDN (e.g., 6A, 6B), a node of the PSTN 8 or a node of another communication network. The switching modules may provide other services.

A PIM (e.g., 44A and 44B) serves as a logical interface between an MCN 2 and a PDN (e.g., 6A, 6B) external to the MCN 2. PDNs 6A and 6B may be any type of packet data network, including the Internet or a corporate LAN. To serve as such logical interface, a PIM may be configured to implement protocols specific to the MCN 2 and protocols specific to a PDN 6. For example, for a GPRS network, a GGSF module may serve as a PIM and be configured to implement one or more packet data protocols, for example, the User Datagram Protocol (UDP) or the Transport Control Protocol (TCP) and IP or X.25 protocols. The GGSF module further may be configured to implement one or more GPRS protocols such as the GPRS Tunneling Protocol (GTP).

A PIM (e.g., PIM 44A or 44B) may be configured to exchange communications (e.g., a Data Call Detail Record (DCDR)) with a charging gateway 45, which may in turn aggregate such DCDRs from one or more PIMs and forward them to a billing system 47 for further processing.

PDN 6B may include a PDN node 66. PDN node 66 may be configured with one or more applications that provide one or more services to users. As such, PDN node 66 may be an application server.

To implement a session between an MT 18A of the MCN 2 and a node 66 of the PDN 6A, the PSM 36A may switch communication packets received from the WASC 32A to PIM 44A, which exchanges communication packets (using the appropriate protocols) with the appropriate nodes of the PDN 6A to communicate with node 66.

Different types of MCNs may have different implementations of a PIM. For a CDMA-based network, a PIM may be a Packet Data Serving Node (PDSN).

For a GPRS network, a PIM may be a GGSF module, which is configured to implement GPRS-defined interfaces: a Gi interface to a PDN, a Gn interface to an SGSF module of the MCN and a Gp interface to an SGSF module from another MCN. On some GPRS networks, an SGSN and a GGSN are combined on the same network node, sometimes referred to as a General Packet Radio Service Support module (GSN). Even on such GSNs, however, the GGSF module and the SGSF module typically are configured as separate, logically-interconnected modules.

The Subscriber Information Register (SIR) 50 may include an entry for each subscriber of the MCN 2, the entry representing a subscriber profile of information about the subscriber, including administrative information about the subscriber, the location of the MT currently being used by the subscriber and information about services to which the subscriber is registered. On a GSM/GPRS network, the SIR may be a Home Location Register (HLR), and an MSC, a GGSF module and a SGSF module may communicate with the HLR in accordance with the Mobile Applications Part (MAP) protocol, GPRS Release 1998 or 1999, on top of an SS7 protocol. Other protocols may be used. GPRS Release 1998 is described in more detail in: *3rd Generation Partnership Project; Technical Specification Group Core Network; Digital cellular telecommunications system (Phase 2+); Organization of subscriber data; Release* 1998 (*3GPP TS* 03.08), and *3rd Generation Partnership Project; Technical Specification Group Core Network; Subscriber data management; Stage 2 Release* 1998 (*3GPP TS* 03.16), the entire contents of which are hereby incorporated by reference.

GPRS Release 1999 is described in more detail in: *3rd Generation Partnership Project; Technical Specification Group Core Network; Organization of subscriber data; Release* 4 (*3GPP TS* 23.008), and *3rd Generation Partnership Project; Technical Specification Group Core Network, Subscriber data management; Stage* 2; *Release* 4 (*3GPP TS* 23.016), the entire contents of which are hereby incorporated by reference.

Intelligent Network Services

The MCN 2 may include one or more SCF modules 48 to provide and control execution of one or more INSs to subscribers. An INS is an advanced communication service beyond traditional services such as setting up, maintaining and terminating a call or session and other traditional telephony services such as call waiting and call forwarding. Several existing technologies today implement INSs by having switching modules (e.g., a PSM or CSM) consult (i.e., exchange communications with) an SCF module to implement the service. For example, on some existing networks, to implement an INS for a circuit-switched telephone call, in response to receiving all of the digits for a telephone number, a CSM initiates communications with an SCF module before contacting other network nodes to establish the connection for the telephone call. Conversely, if no INS is to be implemented for the circuit-switched telephone call, the CSM will not initiate communications with an SCF module before proceeding with establishing the connection.

For a circuit-switched telephone call for which an INS is not to be implemented, a CSM may merely access its routing table to determine where to route the telephone call based on the digits received from the subscriber. If a subscriber has subscribed to an INS, then the routing table may be configured (e.g., programmed with "hooks") to cause the CSM to initiate communications with an SCF module in response to receiving telephone number digits from the subscriber or in response to receiving a specific sequence of digits from the subscriber, or in response to values of any of a number of other parameters.

As will be described in more detail below, an SCF module may be configured with the "intelligence" for implementing the INS. The SCF module may instruct the CSM to switch a telephone call based on any of a number of parameters, for example, time of day, location from which the call is originated, the destination for which the call is bound, etc.

Types of known INSs include Toll-free, Virtual Private Network (VPN), Personal Number, Premium Rate, Calling Card, Toll-Shared, Number Portability and Prepaid Charging. As used herein, "prepaid charging" refers to a type of charging for a service where a subscriber pays for an amount of the service before the service is provided.

Currently, and over the last few years, INSs are being developed and integrated into existing MCNs with each new release of a particular technology. For example, the International Telecommunication Union Telecom Standardization (ITU-T) body specifies INSs in Capability Set 1 (CS-1) and CS-2 of the Q.1200 recommendation series. The European Telecommunications Standards Institute (ETSI) specifies INSs in its Core Intelligent Network Application Part (INAP). The 3GPP specifies INSs for its Customized Applications for Mobile Network Enhanced Logic (CAMEL) technology, Phases 1, 2, 3 as defined in the GSM Technical specification versions 02.78, 03.78 and 09.78 and in the Third Generation (3G) technical specification versions 22.078, 23.078 and 29.078. The American National Standards Institute (ANSI) specifies INSs in its Advanced Intelligent Network (AIN) specifications versions 0.1 and 0.2. The 3GPP2 specifies INSs in its Wireless Intelligent Network (WIN) Phase 2 version N.S004 technical specification. All of the above versions and specifications for INS technologies are hereby incorporated by reference in their entireties.

For illustrative purposes, INSs, particularly prepaid charging, will be described below primarily in the context of the traditional implementation in which an SCM module is consulted, and more specifically will be described primarily in relation to CAMEL technology and in relation to GSM, GPRS, and GSM/GPRS networks.

Intelligent Network Services for Circuit-switched Voice Services

FIG. 4 is an example of a an NSS 110 of an MCN that is capable of providing package-switched services, circuit-switched voice services and one or more INSs for circuit-switched voice services. As used herein, a "circuit-switched INS" is an INS configured for circuit-switched voice services.

The NSS 110 may include an SIR 150, one or more SCF modules 148, one or more CSMs (134a, 134b), one or more PSMs, including PSM 136a, and one or more PIMs, including PIM 144a. Each of these network elements may be configured with functionality that is at least similar to functionality of network elements of the same name described above in relation to NSS 10 of FIG. 3, and also may be configured with additional functionality as follows. The CSM 134a may be configured to exchange call packets 157 with a WASC of a WAS, and exchange call packets 159 with nodes of other communications networks, for example a PSTN. CSM 134a may be configured to communicate packets with such external networks directly or may be configured to use another CSM 134b to communicate with such external networks. As used herein, a "call packet" is a communication unit exchanged between modules of an MCN as part of a circuit-switched voice service (e.g., a telephone call).

To implement one or more INSs on the NSS 110, the SCF module 148 may be configured with circuit-switched INS functionality 149 that defines and controls one or more INSs, for example, prepaid charging. Further, the CSM 134a may include a Service Switching Function (SSF) module 151 configured to exchange communications (e.g., packets) with the SCF module 148 to implement the one or more INSs. As used herein, an "SSF module" is a module (e.g., software, hardware, firmware or any combination thereof) residing on a node of an MCN that is configured to at least assist in implementing one or more INSs by exchanging communications (e.g., packets) with one or more SCF modules that define and control the one or more INSs.

To implement one or more INSs, the SSF module 151 and the SCF module 148 may be configured to exchange one or more circuit-switched-INS packets 147. As used herein, a "circuit-switched-INS packet" is a packet exchanged between network elements to implement a circuit-switched INS. Specifically, the SSF module 151 may be configured to communicate with the SCF module 148 in response to one or more triggering events, such as the initiation of a telephone call, the answering of a telephone call, or the termination of a telephone call (i.e., hanging up).

The SIR 150 may include administration, location and non-INS information 152 for a subscriber, as described above in relation to FIG. 3. In addition, the SIR 150 may include subscriber circuit-switched-INS information 154. For each subscriber, this information 154 may include information about one or more circuit-switched INSs to which the subscriber is registered. For each such circuit-switched INS to which the subscriber is registered, the information 154 may include an identity of the SCF module to be used to implement the INS and the triggering events in response to which an SSF should contact the appropriate SCF module.

Accordingly, when a subscriber attaches to the MCN to which the NSS 110 belongs, the CSM 134a may download from the SIR 150 the subscriber information 155 which includes the subscriber circuit-switched INS information 154. Subsequently, in response to a triggering event, the SSF module 151 may initiate communications with the SCF module 148, and request and receive instructions and information relating to the triggering event.

For example, SSF module 151 may be configured to communicate with the SCF module 148 to implement prepaid charging for a circuit-switched voice service such as the maintenance of a telephone call connection. In response to the CSM 134A detecting the answering of the telephone call by a subscriber, the SSF module 151 may send a circuit-switched INS packet 147 to SCF module 148 to request INS instructions and information for the telephone call. The circuit-switched INS functionality 149 may determine the instructions and information, and the SCF module 148 may send a circuit-switched INS packet 147 including such instructions and information to the SSF module 151.

If the INS is prepaid charging, a packet 147 sent by the SCF module 148 may include information for implementing prepaid charging. The SSF module 151 may be configured to receive such information and to implement prepaid charging accordingly. Further, the SSF module 151 may be configured to communicate with the SCF module 148 throughout the call in response to one or more other triggering events.

Depending on the type of MCN, the NSS 110 may be configured to implement one or more INSs in accordance with one or more of the INS technologies discussed above. For example, if the MCN is a GSM, the SIR 150 is an HLR and the CSM 134A is an MSC, then the SIR 150, the CSM 134A and the SCF module 148 may be configured to implement one or more INSs in accordance with CAMEL, for example, in accordance with CAMEL Phase 1 or 2. Further, the SSF module 151 may communicate with the SCF module 148 in accordance with the CAMEL Application Part (CAP) protocol on top of the signaling system 7 (SS7 protocol) in accordance with CAMEL Phase 1 or 2.

The PSM 136A may be configured to exchange session packets 158 with a WASC of a WAS and exchange session packets 160 with a PIM 144A, which exchanges session packets 162 with one or more nodes of one or more PDNs. As used herein, a "session packet" is a communication unit exchanged between modules of an MCN as part of a session.

Although PSM 136A may be configured to download subscriber information 156, for example, in response to a subscriber attaching to the MCN to which the NSS 110 belongs, and to switch session packets 158 and 160, PSM 136 is not configured to communicate with SCF module 148 to implement one or more packet-switched INSs. As used herein, a "packet-switched INS" is an INS configured for packet-switched services.

Further, SIR 150 does not include subscriber packet-switched INS information, and SCF module 148 does not include any packet-switched INS functionality. Accordingly, NSS 110 is not configured to provide one or more packet-switched INSs.

Intelligent Network Services for Packet-Switched Services

To implement one or more packet-switched INSs on an NSS, it is known to configure an NSS 210 as illustrated in FIG. 5. NSS 210 may include an SIR 250, one or more SCF modules 248, a PSM 236A and a PIM 144A. NSS 210 also may include CSMs 134A and 134B (not shown).

Each of these network elements may be configured with functionality that is at least similar to functionality of network elements of the same name described above in relation to NSS 110 of FIG. 4, and also may be configured with additional functionality as follows. The PSM 236A may be configured to exchange session packets 158 with a WASC of a WAS, and exchange session packets 160 with PIM 144A, which may be configured to communicate session packets 162 with external networks such as a PDN. Further, the PSM 236A may include an SSF module 262 configured to exchange communications (e.g., packets) with the SCF module 248 to implement the one or more INSs.

The SCF module 248 may be configured with functionality at least similar to functionality of SCF module 148, described above in relation to FIG. 4, and in addition may include packet-switched INS functionality 249 that defines and controls one or more INSs, for example, prepaid charging for packet-switched services.

To implement one or more INSs, the SSF module 262 and the SCF module 248 may be configured to exchange one or more packet-switched INS packets 260. As used herein, a "packet-switched-INS packet" is a packet exchanged between network elements to implement a packet-switched INS. Specifically, the SSF module 262 may be configured to communicate with the SCF module 248 in response to one or more triggering events, including the initiation of a session, and the termination of a session.

The SIR 250 may be configured with at least similar information to the information of SIR 150, described above in relation to FIG. 4, and in addition, may include subscriber packet-switched-INS information 254. For each subscriber, this information 254 may include information about one or more packet-switched INSs to which the subscriber is registered. For each such packet-switched INS to which the subscriber is registered, the information 254 may include an identity of the SCF module to be used to implement the INS and the triggering events in response to which an SSF should initiate communications with the appropriate SCF module.

Accordingly, when a subscriber attaches to the MCN to which the NSS 210 belongs, the PSM 236A may download from the SIR 250 the subscriber information 256 which includes the subscriber packet-switched INS information 254. Subsequently, in response to a triggering event, the SSF module 262 may initiate communications with the SCF module 248, and request and receive instructions and information relating to the triggering event.

For example, SSF module 262 may be configured to communicate with the SCF module 248 to implement prepaid charging for a packet-switched service such as the maintenance of a session. In response to the PSM 236A detecting a response by a subscriber to a request to establish a session, the SSF module 262 may send a packet-switched-INS packet 260 to SCF module 248 to request INS instructions and information for the session. The packet-switched INS functionality 249 may determine the instructions and information, and the SCF module 248 may send a packet-switched-INS packet 260 including such instructions and information to the SSF module 262.

If the INS is prepaid charging, the packet 260 sent by the SCF module 248 may include information for implementing prepaid charging. The SSF module 262 may be configured to receive such information and to implement prepaid charging accordingly. Further, the SSF module 262 may be configured to communicate with the SCF module 248 throughout the session in response to one or more other triggering events.

Depending on the type of MCN, the NSS 210 may be configured to implement one or more INSs in accordance with one or more of the INS technologies discussed above. For example, if the MCN is a GSM, the SIR 250 is an HLR and the PSM 236A is a SGSF module, then the SIR 250, the PSM 236A and the SCF module 248 may be configured to implement one or more INSs in accordance with CAMEL, for example, in accordance with CAMEL Phase 3. Further, the SSF module 262 may communicate with the SCF module 248 in accordance with the CAMEL Application Part (CAP) protocol on top of the SS7 protocol in accordance with CAMEL Phase 3.

Establishing a Session for a Roaming Subscriber of an MCN

A typical methodology for establishing a session between a roaming subscriber and a node of a PDN will now be described with reference to FIG. 3. As used herein, a "roaming subscriber" is a subscriber who is accessing network services from outside of his home MCN (i.e., from a visited MCN). A subscriber's home MCN is the MCN from which the subscriber obtains a mobile service subscription. For example, a subscriber may obtain a mobile service subscription from a MCN operator in New England. As the subscriber travels on business in California, the subscriber may access network services provided by an MCN in California (the visited MCN), which may have a roaming arrangement (i.e., agreement) with his home MCN in New England. Such a roaming agreement may specify, among other things, what type of network services the subscriber is allowed and not allowed to access, and how the subscriber will be billed for the network services the subscriber accesses while roaming in the California MCN. For example, the subscriber may be barred from making international calls while roaming in the California MCN.

If a subscriber whose home MCN is MCN 2 (i.e., the home MCN) roams into another MCN 4 (i.e., the visited MCN), the subscriber's MT may communicate with the visited MCN 4 to make telephone calls or establish sessions. The subscriber's MT may initiate an attach (e.g., when the MT is powered on) by sending an attach request to visited MCN 4. In response to receiving the attach request, a PSM 54 of visited MCN 4 may determine the location of the SIR 50 that stores information about the roaming subscriber. For example, the attach request may include the international mobile subscriber identity (IMSI) of the subscriber by which the PSM 54 may determine the location of the SIR 50. The PSM 54 then may communicate with the SIR 50 to retrieve information about the subscriber.

If the roaming subscriber wants to access a node 66 on PDN 6A, the subscriber initiates establishment of a data session with the node 66 through visited MCN 4, e.g., through the PSM 54. For example, the MT of the roaming subscriber may initiate the establishment of a PDP context on a PIM that provides an interface to PDN 6A.

As illustrated in FIG. 3, the home MCN 2 of the roaming subscriber may include PIM 44A (the home PIM) that interfaces to PDN 6A, and visited MCN 4 also may include a PIM 52 (the visited PIM) interfacing to PDN 6A. Thus, to establish a session between the MT of the roaming subscriber and node 66, it should be determined which PIM, home PIM 44A or visited PIM 52, is to be used to establish the session.

Accordingly, in SIR 50 (i.e., the home SIR), an entry for the roaming subscriber may include a field specifying whether to use home PIM 44A or a visited PIM to establish a session to a node of PDN 6A when the subscriber is roaming in MCN 4. Thus, during the attach process as the subscriber is roaming in the MCN 4, the PSM 54 may request profile information for the roaming subscriber from SIR 50. In response, the SIR 50 may send PSM 54 information including a value stored in such a field, and the PSM 54 may determine from such value which PIM to use to establish a session with node 66 of PDN 6A—home PIM 44A or visiting PIM 52. PSM 54 then may use the determined PIM to establish a session with node 66.

SUMMARY

A problem with existing MCNs is that even if a home MCN of the subscriber (i.e., the MCN to which the subscriber subscribes) provides an INS for the subscriber, the INS may not be available to the subscriber as the subscriber roams into a visited MCN if the visited MCN does not support the INS for the roaming subscriber. Typically, if a subscriber roams into a visited MCN, one or more packet-switched INSs, for example, prepaid charging, cannot be performed if: the PSM of the visited MCN is not configured to implement the packet-switched INS for subscribers from the roaming subscriber's home MCN; the PSM of the visited MCN is not configured to implement the packet-switched INS for any roaming subscribers; or the PSM of the visited MCN is not configured to implement the packet-switched INS at all. For example, the visited MCN may be under control by a different operator than the operator of the home MCN and even may be operating in a different country than the home MCN. Typically, to ensure that such INSs are available to a subscriber in a visited MCN, the operator of the home MCN has to coordinate with an operator of the visited MCN such that the necessary network elements in both MCNs are configured to enable implementation of the INS for the roaming subscriber, including configuring such network elements in accordance with particular technologies and protocols for implementing the INS.

Another problem with existing MCNs is that if the MCN is configured to implement an INS only for circuit-switched voice services, then in order to enable the MCN to implement the INS for packet-switched services, typically several network elements must be upgraded or replaced. For example, as illustrated by the differences between the NSS 110 of FIG. 4 and the NSS 210 of FIG. 5, to implement packet-switched INSs on an MCN, various modifications or additions are made to an SIR, one or more SCF modules and one or more PSM modules. Commercially, this may require an MCN operator to either upgrade or replace one or more PSMs, one or more SIRs and one or more SCF modules. For example, on a GSM/GPRS network, an HLR may be upgraded or replaced, one or more SCF modules may be upgraded or replaced and one or more SGSF modules may be upgraded or replaced. For example, to implement prepaid charging on a GPRS network configured in accordance with GPRS Release 98, an SCF module, an SSF module of an SGSF module and an HLR may need to be upgraded in accordance with GPRS Release 1999 (often referred to as UMTS Release 1999).

In a illustrative embodiment of the invention, an Intelligent Network Service for a packet-switched service is implemented on a first mobile communications network having an interface module that serves as an interface for communicating packets between the first mobile communications network and a packet data network external to the first mobile communications network. The Intelligent Network Service is implemented on the interface module for a session between a subscriber of the first mobile communications network and a node located on the packet data network.

This embodiment may be implemented as a computer program product that includes a computer-readable medium and computer-readable signals stored on the computer-readable medium, which signals define appropriate instructions. These instructions, as a result of being executed by a computer, instruct the computer to perform the acts described above for this illustrative embodiment.

In another illustrative embodiment of the invention, a system for implementing an Intelligent Network Service for a packet-switched service on a first mobile communications network is provided. The system comprises an interface module that serves as an interface for communicating packets between the first mobile communications network and is operative to implement the Intelligent Network Service for a session between a subscriber to the first mobile communications network and a node located on the packet data network.

In another illustrative embodiment, a system for implementing an Intelligent Network Service for a packet-switched service on a first mobile communications network is provided. The system comprises an interface module that serves as an interface for communicating packets between the first mobile communications network and a packet data network external to the first mobile communications network. The system also comprises means for implementing the Intelligent Network Service for a session between a subscriber to the first mobile communications network and a node located on the packet data network.

In yet another illustrative embodiment, an Intelligent Network Service for a packet-switched service is implemented on a mobile communications network having a first module. An Intelligent Network Service packet is received at the first module, where the Intelligent Network Service packet comprises circuit-based parameters for implementing the Intelligent Network Service. The circuit-based parameters is converted to packet-based parameters to implement the Intelligent Network Service.

This embodiment may be implemented as a computer program product that includes a computer-readable medium and computer-readable signals stored on the computer-readable medium, which signals define appropriate instructions. These instructions, as a result of being executed by a computer, instruct the computer to perform the acts described above for this illustrative embodiment.

In another illustrative embodiment, a system for implementing an Intelligent Network Service for a packet-switched service on a mobile communications network is provided. The system comprises a first module having an input to receive an Intelligent Network Service packet at the first module, the Intelligent Network Service packet comprising circuit-based parameters for implementing the Intelligent Network Service, and a conversion module to convert the circuit-based parameters to packet-based parameters to implement the Intelligent Network Service.

In another illustrative embodiment, a system for implementing an Intelligent Network Service for a packet-switched service on a mobile communications network is provided. The system comprises a first module to receive an Intelligent Network Service packet at the first module, the Intelligent Network Service packet comprising circuit-based parameters for implementing the Intelligent Network Service. The system also comprises means for converting the circuit-based parameters to packet-based parameters to implement the Intelligent Network Service.

In yet another illustrative embodiment, an Intelligent Network Service for a packet-switched service is implemented for a subscriber of a first mobile communications network as the subscriber is roaming in a second communications network. The first mobile communications network has an interface module that serves as an interface for communicating packets between the first mobile communications network and a packet data network external to the first mobile communications network. The first mobile communications network also has a subscriber information register including an entry storing subscriber information for the subscriber. The interface module is configured to implement the Intelligent Network Service for sessions between the subscriber of the first mobile communications network and a node located on the packet data network. The entry of the subscriber information register is defined such that, if the subscriber attaches to a second mobile communications network and the subscriber information is retrieved and the subscriber initiates a session with the node located on the packet data network, then the session is established using the interface module of the first mobile communications network such that the Intelligent Network Service is implemented for the session.

This embodiment may be implemented as a computer program product that includes a computer-readable medium and computer-readable signals stored on the computer-readable medium, which signals define appropriate instructions. These instructions, as a result of being executed by a computer, instruct the computer to perform the acts described above for this illustrative embodiment.

In another illustrative embodiment, a system for implementing an Intelligent Network Service for a packet-switched service for a subscriber of a first mobile communications network as the subscriber is roaming in a second communications network is provided. The system comprises an interface module that serves as an interface for communicating packets between the first mobile communications network and a packet data network external to the first mobile communications network, where the interface module is operative to implement the Intelligent Network Service for sessions between the subscriber and a node located on the packet data network. The system also comprises a subscriber information register including an entry storing subscriber information for the subscriber, the entry defined such that, if the subscriber attaches to a second mobile communications network and the subscriber information is retrieved and the subscriber initiates a session with the node located on the packet data network, then the session is established using the interface module of the first mobile communications network such that the Intelligent Network Service is implemented for the session.

In another illustrative embodiment, a system for implementing an Intelligent Network Service for a packet-switched service for a subscriber of a first mobile communications network as the subscriber is roaming in a second communications network is provided. The first mobile communications network has an interface module that serves as an interface for communicating packets between the first mobile communications network and a packet data network external to the first mobile communications network. The system comprises a subscriber information register including an entry storing subscriber information for the subscriber, the entry defined such that, if the subscriber attaches to a second mobile communications network and the subscriber information is retrieved and the subscriber initiates a session with a node located on the packet data network, then the session is established using the interface module of the first mobile communications network. The system further comprises means for implementing the Intelligent Network Service for the session on the interface module.

In yet another illustrative embodiment, a packet-switched Intelligent Network Service is implemented for a packet-switched service, where an interface module serves as an interface for communicating packets for the packet-switched service between a first mobile communications network and a packet data network external to the first mobile communications network. Packets are exchanged between a first packet-switching module of the first communications network and the interface module as part of implementing the packet-switched service. The packet-switched Intelligent Network Service is implemented on the first packet-switching module. The packet-switched service is handed off from the first packet-switching module to a second packet-switching module, such that the second packet-switching module now exchanges packets with the interface module as part of implementing the packet-switched service. In response to the handoff, the packet-switched Intelligent Network Service is implemented on the interface module.

This embodiment may be implemented as a computer program product that includes a computer-readable medium and computer-readable signals stored on the computer-readable medium, which signals define appropriate instructions. These instructions, as a result of being executed by a computer, instruct the computer to perform the acts described above for this illustrative embodiment.

In another embodiment, a system for implementing a packet-switched Intelligent Network Service for a packet-switched service is provided. The system comprises a first packet-switching module of the first communications network operative to exchange packets with the interface module as part of implementing the packet-switched service, to implement the packet-switched Intelligent Network Service, and to handoff the packet-switched service from the first packet-switching module to a second packet-switching module, such that the second packet-switching module now exchanges packets with the interface module as part of implementing the packet-switched service. The system also comprises an interface module that serves as an interface for communicating packets for the packet-switched service between a first mobile communications network and a packet data network external to the first mobile communications network. The interface is operative to take-over implementation of the packet-switched Intelligent Network Service in response to the handoff.

In another embodiment, a system for implementing a packet-switched Intelligent Network Service for a packet-switched service is provided. The system comprises a first packet-switching module of the first communications network operative to exchange packets with the interface module as part of implementing the packet-switched service, to implement the packet-switched Intelligent Network Service, and to handoff the packet-switched service from the first packet-switching module to a second packet-switching module, such that the second packet-switching module now exchanges packets with the interface module as part of implementing the packet-switched service. The system also comprises an interface module that serves as an interface for communicating packets for the packet-switched service between a first mobile communications network and a packet data network external to the first mobile communications network. The system further comprises means for the interface module to take-over implementation of the packet-switched Intelligent Network Service in response to the handoff.

Although many of the examples and embodiments presented herein involve specific combinations of method acts or system elements, it should be understood that those acts and those elements may be combined in other ways to accomplish the same objectives. Acts, elements and features discussed only in connection with one embodiment of a system or method are not intended to be excluded from a similar role in other embodiments.

Other advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION

Figure 1:
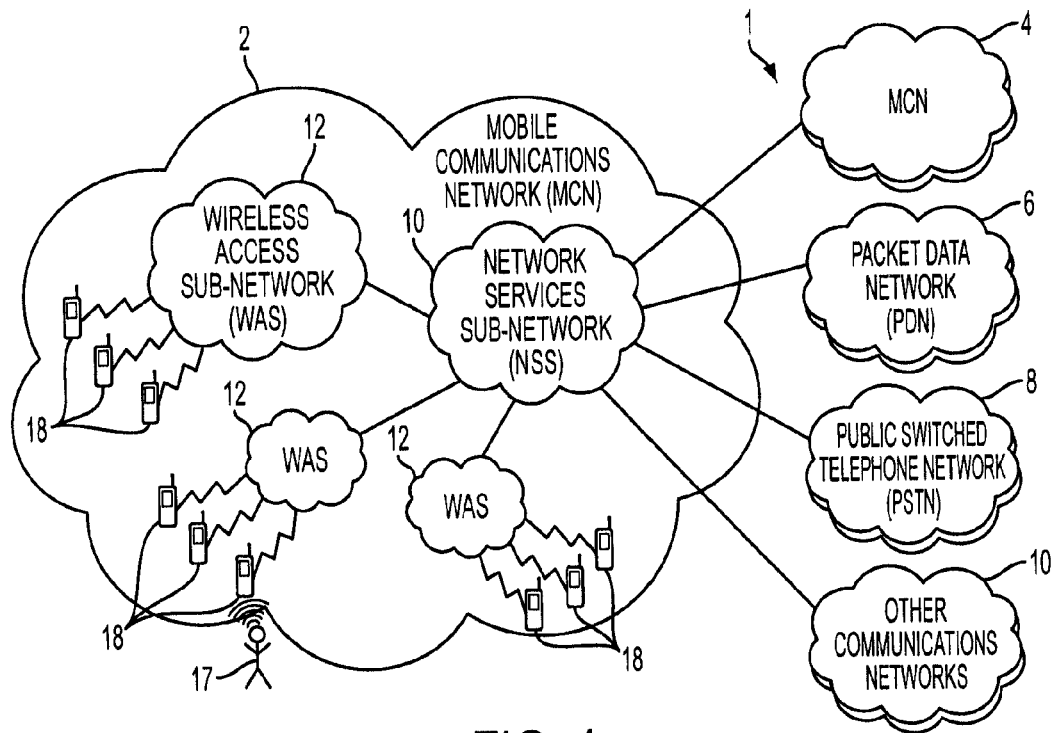
FIG. 1 is a block diagram illustrating an example of a typical communications network including a mobile communications network.
Figure 2:
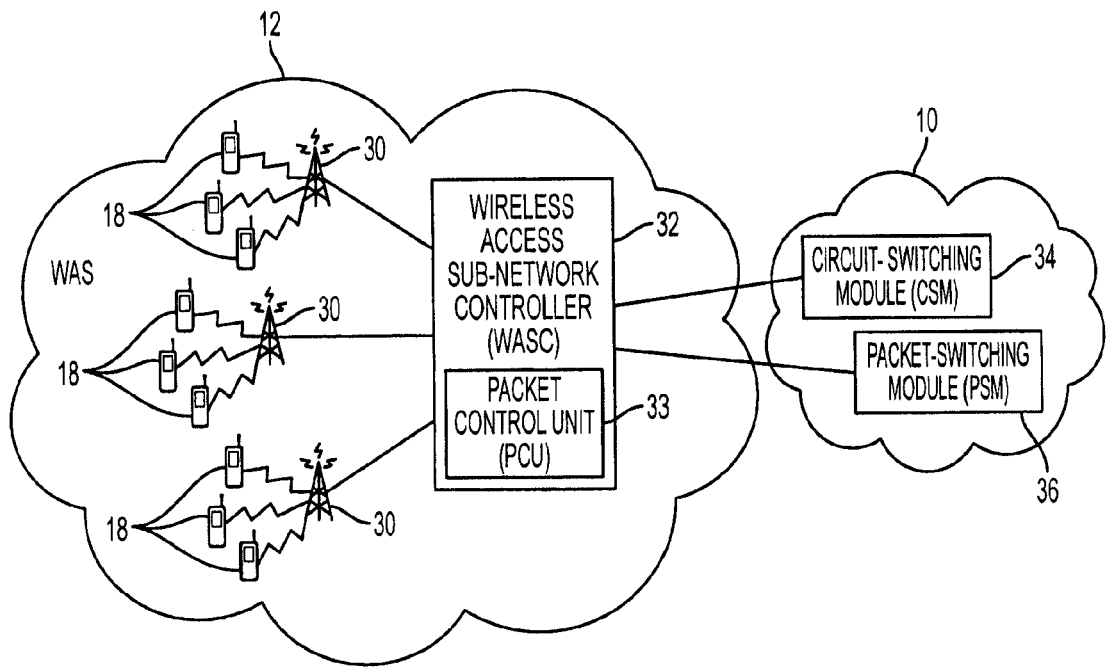
FIG. 2 is a block diagram illustrating an example of a typical wireless access sub-network of a mobile communications network.

Although several embodiments of the invention described below are described primarily in relation to implementing prepaid charging for packet-switched services, the systems and methods described herein are not limited thereto, but may be applied to other Intelligent Network Services (INSs) for packet-switched services, for example, the INSs described above. Further, some embodiments of the invention below describe implementing an INS by exchanging communications with an SCF module, the invention is not limited to such implementations, as a network element such as a CSM or PIM may be configured to implement one or more INSs without consulting an SCF module or any other network elements, or by consulting one or more other network elements in addition to or as an alternative to consulting an SCF module. Such network elements may reside internal to the NSS of an MCN, or external to the NSS, for example, on a corporate LAN or the Internet. In addition, although specific examples of INSs are described above as being implemented using particular protocols and technologies, the invention is not limited to such technologies and protocols, as other protocols and technologies (e.g., IP-based protocols) may be used to implement INSs and are intended to fall within the scope of the invention.

Further, although some embodiments of the invention described below are described primarily in relation to mobile communications networks (MCNs), the systems and methods described herein are not limited thereto, but may be applied to other types of communications networks, including landline communications networks.

In an embodiment of the invention, a module (e.g., a PIM) interfaces a mobile communications network (MCN) to a packet data network (PDN) and is capable of implementing an Intelligent Network Service (INS), for example, prepaid charging and/or, for a packet-switched service for subscribers of the MCN. A PIM operative as such may obviate a need to configure (e.g., replace or upgrade) a packet-switching module (PSM) so that the PSM can implement one or more INSs. It should be understood that a PIM that implements an INS may receive assistance for such implementation from other network elements on an MCN, for example, a Service Control Function (SCF) module.

Implementing one or more INSs on a PIM contrasts existing MCNs on which INSs are implemented on a PSM or CSM, the benefits of which are described below.

Optionally, a PIM may be operative to implement such prepaid charging in real-time, in contrast to systems that simulated real-time prepaid charging, for example, by implementing "hot billing", which is described below in more in relation to FIG. 7. An embodiment of a PIM implementing prepaid charging in real time is described in What's all the Fuss About Metering?, a whitepaper from WaterCove Networks, Inc. of Chelmsford, Mass., the entire contents of which are hereby incorporated by reference.

As used herein, "real-time" prepaid charging for a service means prepaid charging for the service where, during initiation of a session for the service, a subscriber's prepaid balance for the service is converted into a threshold amount of service, and the amount of service consumed by the subscriber is metered and compared to the threshold (or an amount of service derived therefrom) while the service is being provided. Such threshold amount may be a period of time and the amount of service compared to the period may be a duration of the service, or the amount of service may be a count and the amount of service compared to the count may be a number (i.e., volume) of information units exchanged during the service.

In an aspect of this embodiment, the PIM determines both a count and a time period from the prepaid balance, and compares the number of information units exchanged during the service and the duration of the service against the count and time period, respectively.

In an embodiment of the invention, an entry for a subscriber in a Subscriber Information Registry (SIR) of a home MCN may be defined such that when a subscriber roams into a visited MCN, the PIM of the home MCN is used to implement a session between the MT of the subscriber and a node of a PDN. As a result, one or more INSs (e.g., prepaid charging) for packet-switched services may be provided for the subscriber as the subscriber roams in other MCNs.

In another embodiment of the invention, a Service Switching Function (SSF) module of an MCN is operative to implement an INS for packet-switched services by exchanging communications with an SCF module operative to implement the INS only for circuit-switched voice services. Such an SSF module may be operative to convert circuit-based INS parameters (e.g., time-based thresholds) into packet-based INS parameters (e.g., count-based thresholds), and conversely, to convert packet-based INS parameters into circuit-based INS parameters.

A module operative as such may obviate a need to configure an SCF module of an MCN to implement the INS for packet-switched services. Further, such a module enables charging (i.e., billing) for both packet-switched (e.g., data, audio, video or a combination thereof) services and circuit-switched voice services to be implemented using a single INS account.

Further, an MCN may include a register, separate from a subscriber information register (SIR), that includes subscriber packet-switched-INS information. Such a register may be part of a PIM, or may be a separate node of the MCN. Such a register may obviate a need to configure an SIR to include subscriber packet-switched INS information.

Alternatively, subscriber packet-switched-INS information may be stored in an SIR, for example, along with other subscriber information, or be stored on another network element of an MCN, such as a PIM or a PSM. Further, such packet-switched-INS information may be distributed across one or more network elements such that one or more network elements may store at least part of the packet-switched-INS information, and one or more network elements may store the same such information.

In another embodiment of the invention, implementation of an INS for a packet-switched service is toggled between a PSM and a PIM, for example, in response to the packet-switched service being handed-off to or from the PSM. In one aspect, the INS may be implemented first by the PSM for a first duration of the service and then implemented by the PIM for a second duration of the service. In another aspect, the INS may be implemented first by the PIM and then by the PSM during the service. In another aspect, implementation of a service may be toggled back and forth between a PSM and PIM more than once.

EXAMPLES

1. Implementing Intelligent Network Services on a PDN Interface Module of an MCN Although implementing prepaid charging is described below in relation to FIGS. 8-14 primarily in the context of packet-switched services, such illustrative embodiment is not meant to limit the scope of the invention, as prepaid charging may be performed for other types of services as well, for example, services implemented using a virtual circuit technology such as Asynchronous Transfer Mode (ATM) technology.

Figure 6:
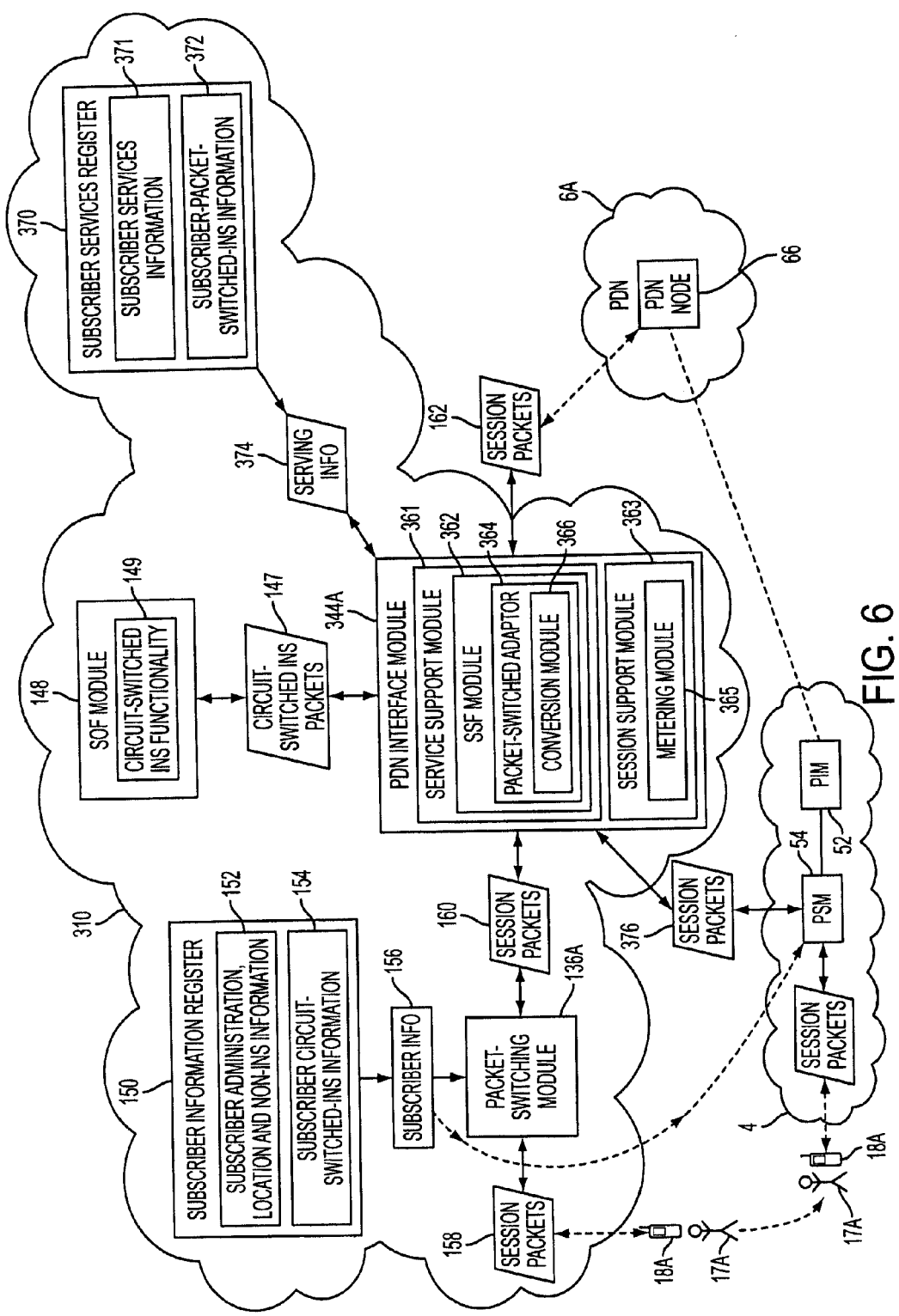
FIG. 6 is a block diagram illustrating an example of a mobile communications network configured to implement Intelligent Network Services for packet-switched services and to implement packet-switched Intelligent Network Services for subscribers of the mobile communications network visiting other mobile communications networks.

FIG. 6 illustrates an example of an NSS 310 including a PIM 344A (e.g., a GGSF module) for implementing one or more packet-switched INSs. NSS 310 may include any of an SIR 150, an SCF module 148, a PSM 136A, PIM 344A and a subscriber services register (SSR) 370. NSS 310 also may include one or more CSMs, for example, CSM 34A or 134A (not shown) as well as other network elements. Each of the network elements of NSS 310 may be interconnected with other network elements by any of a variety of types of transmission media, including cables, wires, optical fibers, air, and combinations thereof. Other network elements may include switching elements, for example, transceivers, repeaters, switches, routers, bridges, and combinations thereof.

NSS 310 may be part of any of a variety of types of MCNs described above, for example, a GPRS network, a GSM/GPRS network, a UMTS network, any type of CDMA networks (e.g., cdmaOne, cdma2000, etc.), a Wireless PAN, for example, Bluetooth or a wireless PAN in accordance with IEEE 802.15, a WLAN, for example, HiperLan 2 or a WLAN in accordance with IEEE 802.11 (e.g., 802.11b (Wi-Fi), 802.11a and 802.11g), or any other type of MCN.

Figure 4:
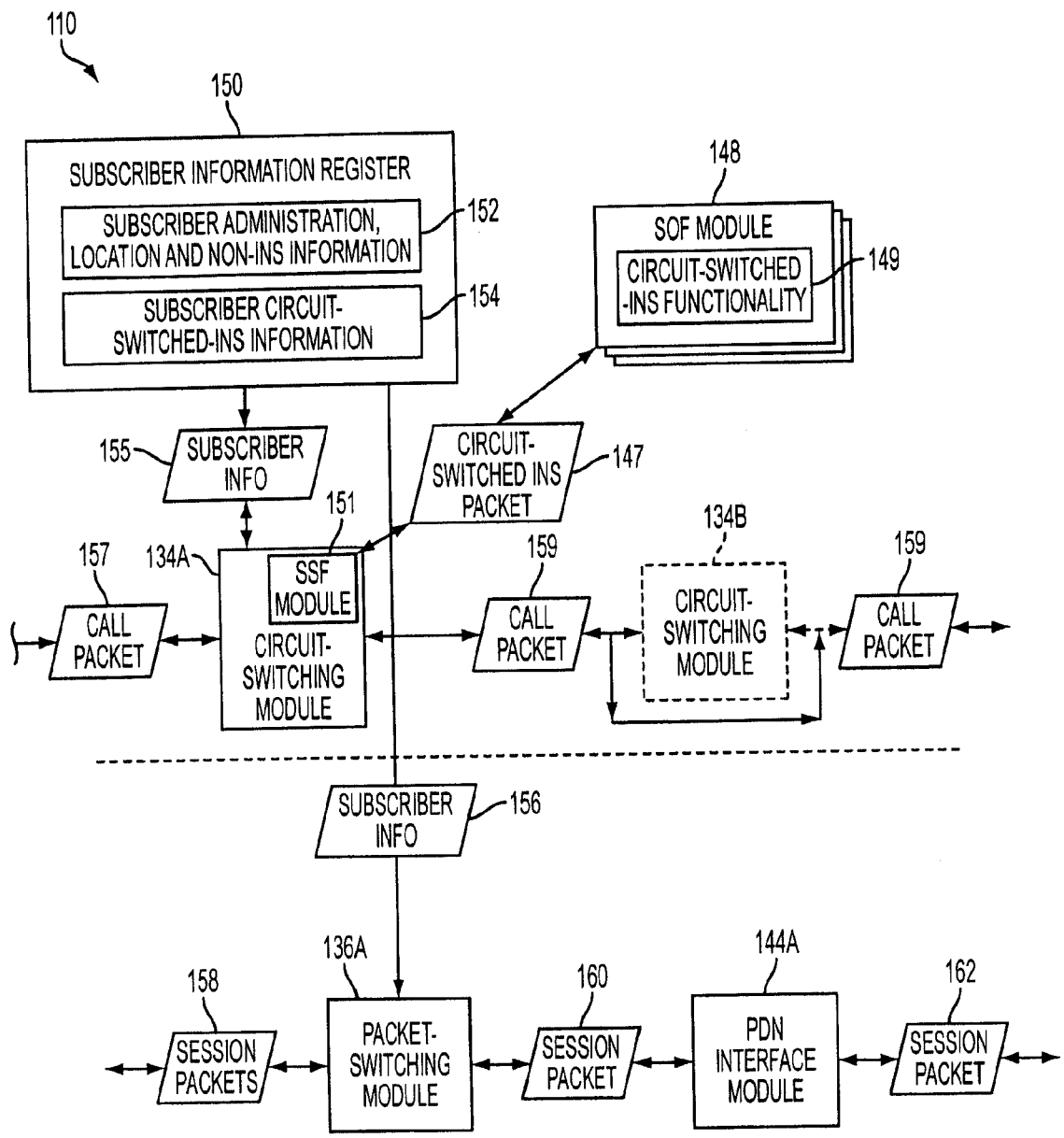
FIG. 4 is a block and data flow diagram illustrating an example of a typical network services sub-network configured to implement Intelligent Network Services for circuit-switched voice services.

SIR 150, SCF Module 148 and PSM 136A may be configured similar to, and possibly the same, as described above in relation to NSS 110 of FIG. 4. The PSM 136A may be configured to exchange session packets 158 with a WASC of a WAS, and exchange session packets 160 with PIM 344A, which may be configured to communicate session packets 162 with external networks such as PDN 6A. In an embodiment, PIM 344A is a WN 1200 Intelligent Support Node available from WaterCove Networks, Inc. of Chelmsford, Mass.

SSF module 362 may be configured to exchange packets with SIR 150 in accordance with any of one or more signaling transport technologies, which may incorporate combinations of one or more protocols, for example, SS7 signaling transport technologies (e.g., MAP over Transaction Capabilities Application Part (TCAP) over Signaling Connection Control Part (SCCP) over Message Transfer Part (MTP)), SS7 over IP signaling transport technologies (e.g., as described in IEFT Request For Comments (RFC) 2719 Framework Architecture for Signaling Transport, IP signaling transport technologies (e.g., GTP over User Datagram Protocol (UDP) over IP, or Radius over TCP over IP), or other signaling transport technologies.

The SCF module 148 may include circuit-switched INS functionality 149 that defines and controls execution of one or more INSs, for example, prepaid charging, for circuit-switched voice services. For prepaid charging, the circuit-switched INS functionality 149 may include subscriber prepaid charging information such as an amount of service currently prepaid for by a subscriber. For example, a subscriber may have prepaid $4.00 for 20 minutes of service.

To implement one or more INSs, the SSF module 362 and the SCF module 148 may be configured to exchange one or more circuit-switched INS packets 147. Specifically, the SSF module 362 may be configured to exchange communications with the SCF module 148 in response to one or more triggering events, such as the initiation of a session, or the termination of a session.

SSF module 362 may be configured to exchange packets with SCF module 148 in accordance with any of one or more signaling transport technologies, which may incorporate combinations of one or more protocols, for example, SS7 signaling transport technologies (e.g., CAP over TCAP over SCCP over MTP), SS7 over IP signaling transport technologies (e.g., CAP over TCAP over S3UA over IP), IP signaling transport technologies (e.g., GTP over UDP over IP, or Radius over TCP over IP), or other signaling transport technologies.

As will be described in more detail below, a circuit-switched INS packet 147 transmitted from the SCF module 148 or the SSF module 362 may include circuit-based parameters. Accordingly, the SSF module 362 may include a packet-switched adapter 364 configured to implement an INS for packet-switched services using circuit-based parameters.

Such implementation may include exchanging packets with the SCF module 148 using circuit-based parameters.

The packet-switched adapter 364 may include a conversion module 366 configured to convert circuit-based parameters to packet-based parameters and vice versa. For example, if the INS is prepaid charging, the conversion module 366 may be configured to convert a call period that specifies an amount of time prepaid for by a subscriber into a count threshold or a time threshold for a session. The count threshold may serve as a threshold for a number of information units (e.g., bytes, kilobytes, packets) transmitted during a session, as will be described below. The time threshold may serve as a threshold amount of time of a session. The conversion module 366 also may be configured to convert the count threshold or time threshold back into a call period. Such conversions are described below in more detail.

In an embodiment, the PDN interface module 344A may be logically and/or physically divided into two modules, a service support module 361 and a session support module 363. Service support module 361 may be configured to manage coordination between session layers and service layers of a service and to assist in implementing INSs, and thus module 361 may include SSF module 362. Service support module 361 may include additional logic to assist implementing services using PDP context profiles and APN profiles including handling requests to operate PDP contexts, discussed below in more detail in relation to FIGS. 7 and 8.

In an embodiment of NSS 310, one or more service support modules 361 and session support modules 363 may reside on separate nodes of NSS 310.

The session support module 363 may include flow control functionality, session control functionality and functionality for metering a session between a subscriber and a node of a PDN.

The session support module 363 may include a metering module 365, which may be configured to meter a session between a subscriber and a node of a PDN. Metering a session may include determining a number of information units (e.g., transactions, packets, kilobytes, bytes) exchanged between the subscriber and the PDN node during the session, metering a duration of the session or any combination thereof. The SSF module 362 may be configured to control such metering and to report the results of such metering to the SCF module 148.

PIM 344A may be further configured to exchange communications with application servers located external to NSS 310, for example, on PDN node 66, to establish an initial time or count (i.e., volume) threshold for a service. For example, PIM 344A may be configured with one or more application programming interfaces (APIs) that enable such configuration. Accordingly, PIM 344A may be configured to notify an application residing on an application server when a threshold amount has been consumed by a session. This ability to associate a service with a session and a subscriber may be accomplished by defining one or more elements of NSS 310, as will be discussed in more detail below.

Figure 5:
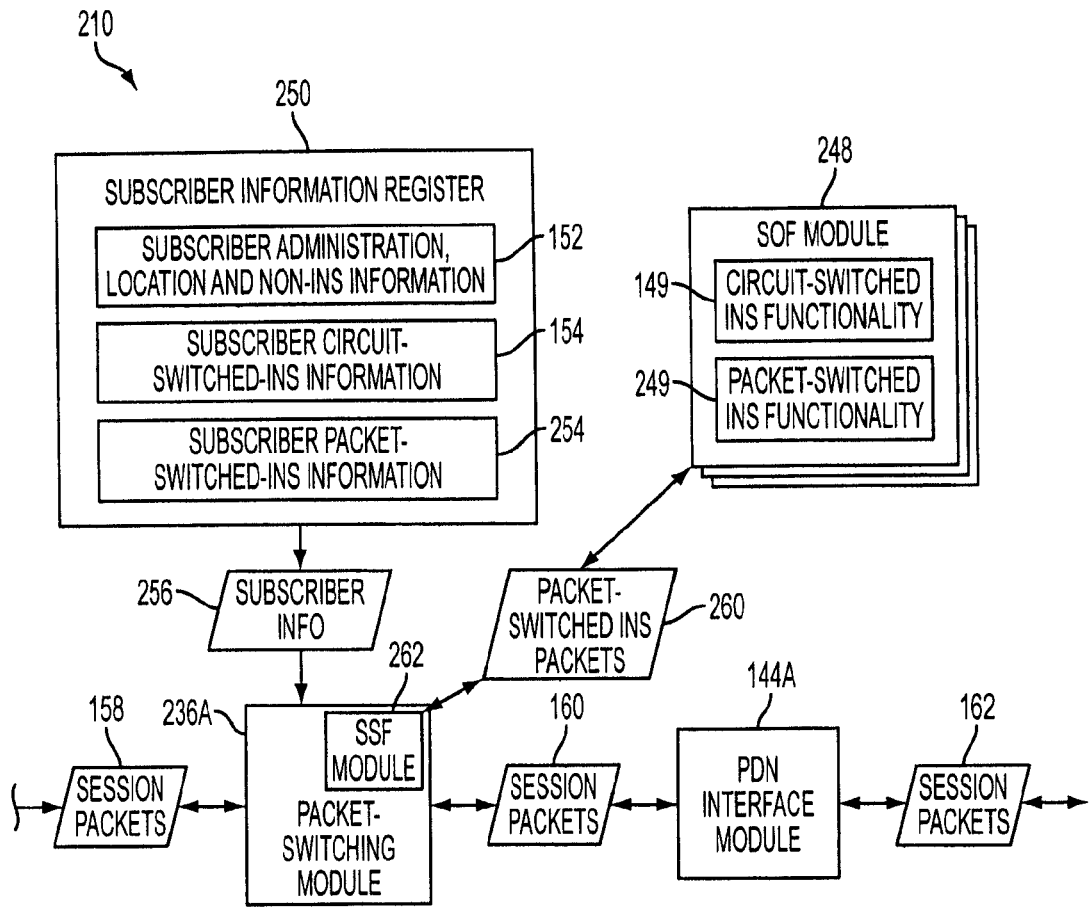
FIG. 5 is a block and data flow diagram illustrating an example of a typical network services sub-network configured to implement Intelligent Network Services for packet-switched services.

Configuring the SSF module 362 with packet-switched adapter 364 as described above may obviate a need to configure the SCF module 148 with packet-switched INS functionality (e.g., functionality 249 described above in relation to FIG. 5) in order to implement an INS. For example, if an SCF module 148 is configured to implement prepaid charging in accordance with CAMEL Phase 2 for circuit-switched voice services, the SCF module 148 does not need to be upgraded or replaced in order to implement prepaid charging in accordance with CAMEL Phase 3 for packet-switched services. The packet-switched adapter 364 may be configured to implement the prepaid charging in accordance with CAMEL Phase 3 using the CAMEL Phase 2 parameters included in the prepaid charging packets transmitted from the SCF module 148. For example, the conversion module 366 may be configured to convert the CAMEL Phase 1 or 2 prepaid charging parameters (e.g., call period) to CAMEL Phase 3 prepaid charging parameters (e.g., count or time thresholds), and vice versa. The capability of the conversion module 366 to convert CAMEL Phase 3 prepaid charging parameters into CAMEL Phase 2 prepaid charging parameters, and vice versa, enables the SSF module 362 to exchange prepaid charging packets with the SCF module 148 in accordance with CAMEL Phase 2.

The SSF module 362 also may be configured to exchange packet-switched-INS packets with SCF module 148 if SCF module 148 is configured with packet-switched INS functionality. Further, the SSF module 362 may be configured to selectively exchange circuit-switched or packet-switched INS packets with SCF module 148, for example, in accordance with CAMEL Phase 1, 2 or 3, respectively, depending upon the capabilities of the SCF module 148.

Although SSF module 362 has been illustrated in relation to FIG. 6 as being part of PIM 344A, alternatively, SSF module 362, including packet switched adapter 364 and conversion module 366, may be configured as part of PSM 136A or another network element. Further, SSF module 362 may be distributed across a plurality of network elements. Communications exchanged between SSF module 362 and SCF module 148 are described in more detail below.

SSR 370 may include subscriber services information 371. For each subscriber, information 372 may include information about one or more services, including subscriber packet-switched-INS information 372 for packet-switched INSs to which the subscriber is registered. For each such packet-switched INS to which the subscriber is registered, information 372 may include an identity of the SCF module (e.g., SCF module 148) to be used to implement the INS, triggering events in response to which an SSF should initiate communications with the appropriate SCF module, and other information. At least some of this other information may be used by the SSF module 362 to implement an INS for a packet-switched service using circuit-switched INS packets 147 exchanged with SCF module 148.

Subscriber services information 371 also may include information about one or more services provided by service providers from servers located external to NSS 310, for example, on PDN node 66. For example, information 371 may include at least one of a subscriber agreement (e.g., a PDP profile data structure 1000) and a service agreement (e.g., an APN profile data structure 1100), each of which is described in more detail below.

Figure 7:
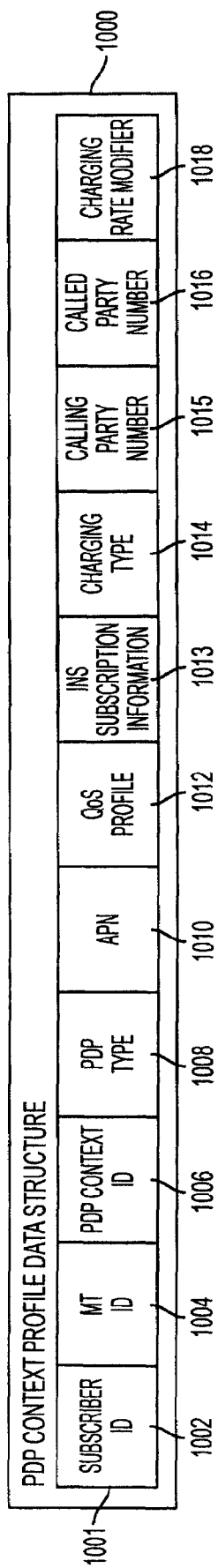
FIG. 7 is a block diagram illustrating an example of a PDP context profile data structure.

FIG. 7 is a block diagram illustrating an example of a PDP context profile data structure 1000 that includes one or more PDP context profiles 1001, each profile 1001 including one or more information elements (IEs). Each profile 1001 may define a subscriber's subscription to a specific service, and thus may serve as a link between the subscriber's subscription to the MCN and the subscriber's subscription to a service offered by the service provider. An APN profile 1101, described below in relation to FIG. 8, defines a service agreement between the MCN of NSS 310 and a service provider, values for which may be overridden or combined with values specified by a PDP context profile 1001 defined for a specific subscriber. Thus, each profile 1001 includes subscription information for a particular subscriber for an APN, from which a PDP context session may be generated. Data structure 1000 may be any of a variety of types of data structures, including an object, a table, or a plurality of records separated by delimiters. Other types of data structures may be used also.

The PDP context profile 1000 may include any of: subscriber ID IE 1002, MT ID IE 1004, PDP context ID IE 1006, PDP type IE 1008, APN IE 1010, QoS profile IE 1012, INS subscription information IE 1013, charging type 1014, calling party number IE 1015, called party number IE 1016, charging rate modifier IE 1018, and possibly other IEs.

The subscriber ID IE 1002 uniquely identifies the subscriber, and may serve as a key or index for the PDP context profile 1001 along with APN IE 1010. Depending on the type of MCN, the IE 1002 may specify an IMSI or another type of unique identifier of a subscriber.

The MT ID IE 1004 identifies the MT (mobile terminal) for which this PDP context profile applies. Depending on the type of MCN, the IE 1004 may specify an MSISDN or another type of unique identifier of an MT. IE 1006 is a unique identifier for the PDP context profile and may serve as a key or index for the PDP context profile 1001. IE 1008 identifies the type of PDP, for example, IP or Point-to-Point Protocol (PPP).

IE 1010 specifies an APN for which the profile 1001 is defined. IE 1010 may serve as an index to an APN profile 1101. IE 1012 specifies the quality of service subscribed to by the subscriber for this PDP context.

IE 1013 specifies information about one or more INSs subscribed to by the subscriber for this PDP context. For example, IE 1013 may include information about prepaid charging, including the location of the SCF module to be used to implement prepaid charging, for example, an IP address or other type of location identifier of SCF module 148.

IE 1014 specifies the type of charging subscribed to by the subscriber for this PDP context. Types of charging may include, but not be limited to, postpaid charging, flat-rate charging, hot billing or real-time prepaid charging. Postpaid charging is a type of charging for which a subscriber receives the service first, and then pays for the service periodically, for example, monthly. For each session or telephone call across an MCN for postpaid charging, an operator generates a Call Detail Report (CDR), and consolidates these CDRs to generate the periodic bill. Thus, if a subscriber makes five telephone calls during a month, an operator may generate five CDRs from which a monthly bill is generated.

As described above, prepaid charging means that an amount of service is paid for in advance of the service being provided. Real-time prepaid charging also is defined above.

Figure 3:
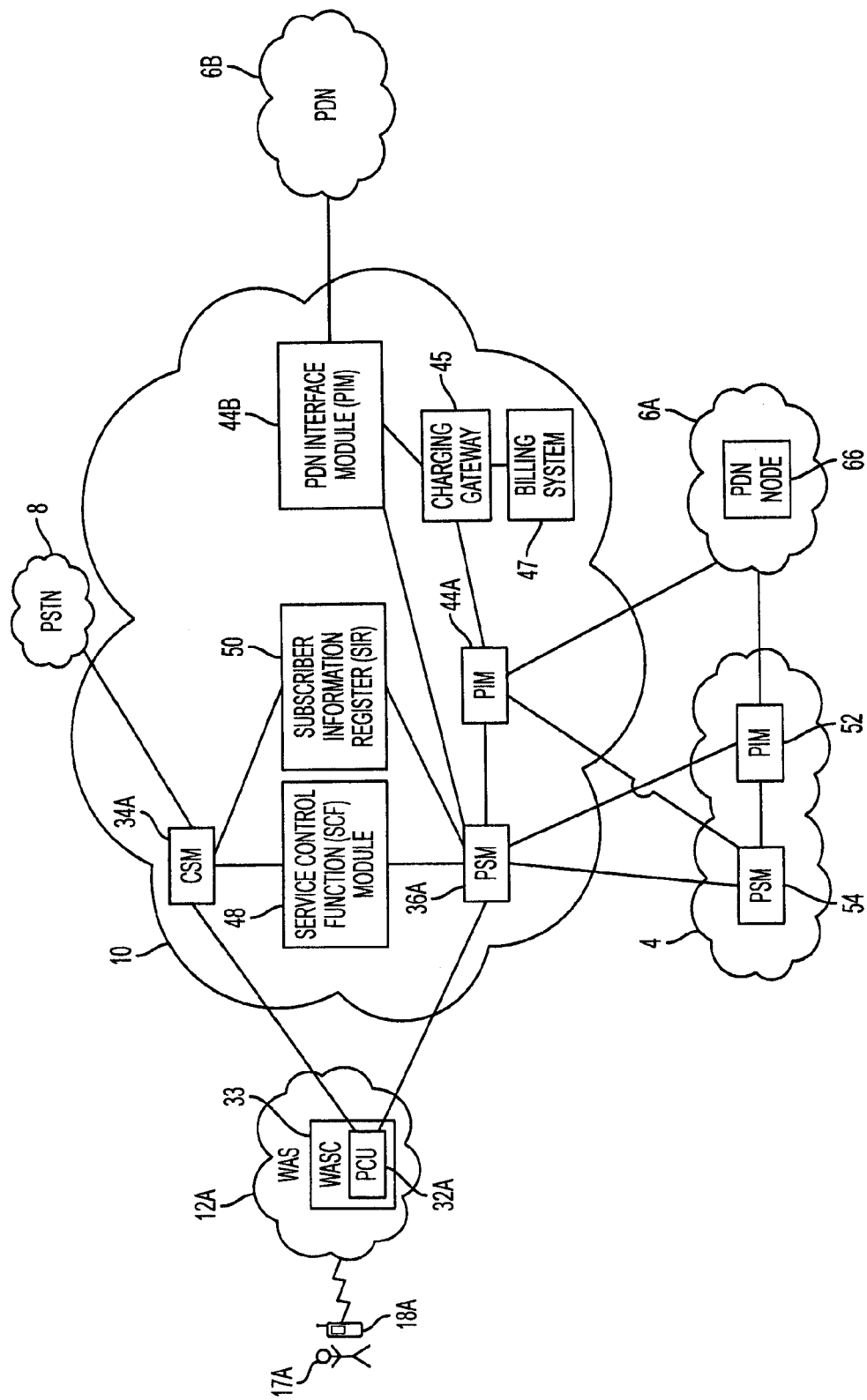
FIG. 3 is a block diagram illustrating an example of a typical network services sub-network of a mobile communications network.

Another type of prepaid charging is "hot billing", which some MCN operators provide to attempt to emulate some of the capabilities of real-time prepaid charging. Hot billing is implemented by generating CDRs at periodic intervals throughout a session or telephone call. The smaller such an interval is configured, the less amount of time a subscriber is able to exceed a threshold amount of service, and the closer hot billing emulates the ability of real-time prepaid charging to prevent a subscriber from exceeding a threshold amount of service. Each time a CDR is generated, the CDR may be reported to a billing module (e.g., charging gateway 45 of FIG. 3), which typically resides on a network node separate from the node on which the metering occurs, and further instructions may be awaited from the billing module. For example, a PSM may generate a CDR every five minutes for a session on an MCN, and report the CDR to a billing module presiding on another node of the MCN. The billing module then may determine if the user has enough credit or a plan that enabled the user to continue the session. The billing module then may send the PSM instructions regarding whether to terminate the session or continue.

A problem with hot billing is that a subscriber may be able to use a service beyond that for which the subscriber has paid or contracted. For example, if the user has 55 minutes and 1 second of credit remaining in their account, and CDRs are being generated every five minutes, then after the eleventh CDR, the billing module will allow the user to continue a session or telephone call for an additional five minutes, thereby allowing the user four minutes and 59 seconds of extra use.

Further, although the ability to obtain such extra use may be reduced by reducing the CDR-generation interval, such reduction results in more CDRs being generated, thereby increasing the traffic load of the MCN.

IE 1014 further may specify different types of prepaid charging. For example, IE 1014 may specify a typical type of packet-switched pre-paid charging such as CAMEL Phase 3 on a GPRS, GMS/GPRS or UMTS network. Alternatively, IE 1014 may specify a type of prepaid charging where the SSF module communicates with the SCF module in accordance with circuit-switched voice prepaid charging, but the SSF module implements prepaid charging in accordance with packet-switched prepaid charging. This type of prepaid charging may be referred to herein as packet/circuit-switched prepaid charging. For example, IE 1014 may specify that the SSF module communicates with the SCF module in accordance with CAMEL Phase 2, and that the SSF module implements prepaid charging in accordance with CAMEL Phase 3. Further, for such CAMEL Phase 2/Phase 3-type prepaid charging, IE 1014 may specify whether this type of prepaid charging meters the duration of the PDP context session or meters a number of information units transmitted during the PDP context session.

PIM 344A may be configured to implement one or more types of charging for a packet-based service, including postpaid charging, flat-rate charging, hot billing, one or more types of prepaid charging and other types of charging, IE 1015 specifies a calling party number for the PDP context. IE 1015 may map a telephone number to a PDP context session, and can be useful for packet/circuit-switched prepaid charging. For example, for a given subscriber, circuit-switched INS functionality 149 may include a phone number associated with the subscriber, but may not have the capability of associating a PDP context session with the subscriber. Consequently, if the SSF module 362 attempts to access the circuit-switched INS functionality 149 using a PDP context ID, the SCF module 148 will not understand the PDP context ID.

Associating a calling party number with a PDP context session enables the SSF module 362 to specify a telephone number to the SCF module 148 when attempting to initiate use of an INS. The SCF module 148 then can recognize the telephone number and be able to control implementation of the INS. Thus, by mapping a telephone number to a PDP context session, the SCF module 148 does not need to be configured (e.g., updated or replaced) to recognize a PDP context ID.

In some cases, the calling party number may be a telephone number already associated with a subscriber. For example, if the MCN is a GSM/GPRS network, the calling party number may be the telephone number assigned to the subscriber and stored in an MSC of the GSM network.

IE 1016 specifies a called party number for the PDP context. As will be described below in relation to IE 1104 of an APN profile 1101, IE 1104 may specify a called party number that defines a default charging plan for an APN to be used for any PDP context session that uses the service defined by the APN. Such a called party number may enable an SCF module configured to implement prepaid charging for circuit-switched voice services to associate a charging plan with a PDP context session. IE 1016 specifies a called party number that may be associated with a specific subscriber that overrides the called party number associated with the APN specified by IE 1010. The ability to associate a called party number with a specific subscriber enables a charging plan to be associated with particular subscriber when the subscriber establishes a PDP context session with a node of a PDN.

IE 1018 specifies a charging rate modifier for a PDP context. This charging rate modifier enables customizations for a particular subscriber of a generic charging plan associated with an APN.

Figure 8:
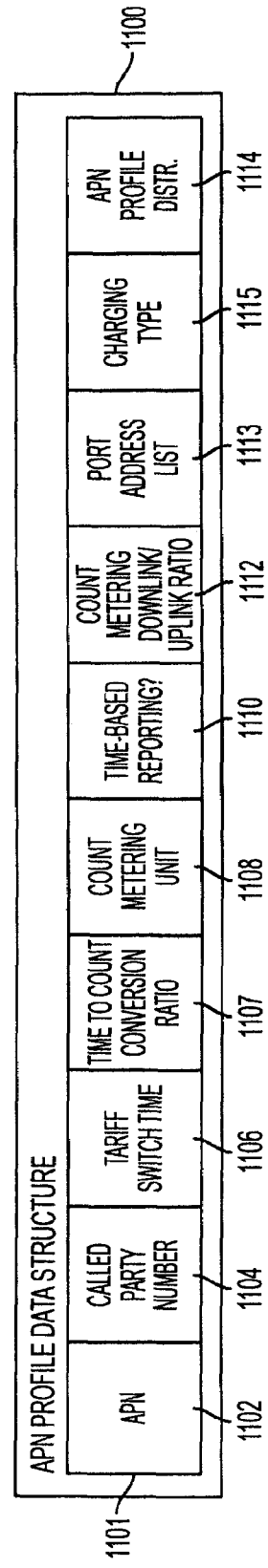
FIG. 8 is a block diagram illustrating an example of an APN profile data structure.

FIG. 8 is a block diagram illustrating an example of an APN profile data structure 1100 for an APN configured for prepaid charging. Data structure 1100 may include one or more APN profiles 1101, each profile 1101 including one or more IEs. Data structure 1100 may be any of a variety of types of data structures, including an object, a table, or a plurality of records separated by delimiters. Other types of data structures also may be used.

An APN profile 1101 may define an access agreement between the MCN of NSS 310 and a PDN (e.g., PDN 6B). Profile 1101 may define access points (e.g., port addresses of a PIM) that serve as interfaces between NSS 310 and one or more PDNs, and also may define, for an APN, one or more access methods (e.g., open IP, tunneled, encrypted, etc.) that may be used by the interfaces.

One or more of the information elements of an APN profile 1101 may define values of service parameters for a service provided to subscribers of the MCN of NSS 310. Some of these values may be defined to be overridable by values of the service parameters specified for a specific subscriber as defined in corresponding PDP context profile 1001. Other values may be defined so that they cannot be overridden by values specified for a subscriber, and other values may be defined to be combined (e.g., aggregated) in some fashion with values defined for a subscriber.

Each entry 1101 may include an APN IE 1102, a called party number IE 1104, a tariff switch time IE 1106, a time-to-count conversion ratio IE 1107, a count metering unit IE 1108, a time-based reporting IE 1110, a count metering downlink/uplink ratio IE 1112, a port address list IE 1113, a charging-type IE 1115, an APN profile distribution IE 1114 and one or more other IEs.

IE 1102 specifies an APN, and may be used as a key for an APN profile 1101.

IE 1104 specifies a called party number associated with the APN. An SCF module 148 may not be configured to associate an INS with an APN; however, an SCF module 148 may have the ability to associate a telephone number with an INS. For example, circuit-switched INS functionality 149 may recognize a telephone number for a subscriber associated with an INS. Accordingly, called party number 1104 may be used to map a telephone number to the APN specified in IE 1102. Thus, when SSF module 362 attempts to initiate an INS with SCF module 148 for a packet-switched service using the APN, SSF module 362 may specify the telephone number defined by IE 1104. Accordingly, the SCF module 148 can control implementation of the INS using a telephone number, and the SSF module can map this telephone number to the APN specified by IE 1102.

IE 1106 specifies a tariff switch time associated with prepaid charging for this APN. A tariff switch time is used for circuit-switched voice prepaid charging to specify a time at which a charging rate changes for an APN. For example, a charging plan associated with the APN may specify that before 8:00 p.m. a first rate applies, but after 8:00 p.m. a second rate applies.

If the type of prepaid charging specified by IE 1014 is time-based prepaid charging, then IE 1106 may be used to determine when a report is to be transmitted from an SSF module to an SCF module so that the SCF module may determine a new time threshold based on the prepaid amount and new charging rate. If the type of prepaid charging is count-based prepaid charging, the tariff switch times specified by IE 1106 may be used by an SSF module to recalculate a count threshold based upon a prepaid amount and new charging rate, as will be described below in more detail in relation to FIGS. 10A and 10B.

IE 1107 may specify a time-to-count conversion ratio to be applied to convert a call period to a count and vice versa for the APN specified by IE 1102. For example, IE 1107 may specify a ratio for converting minutes or seconds to a count corresponding to a number of information units, e.g., packets, kilobytes or bytes. Other conversion ratios and units may be used.

Count metering unit 1108 specifies the information unit to be used to meter the number of information units exchanged of a PDP context session, for example, byte, kilobyte, packet, transaction, or other information unit.

IE 1110 may specify whether time-based reporting is to be used between an SSF module and an SCF module for a PDP context session of the APN for which count-based prepaid charging has been defined. In other words, although the number of exchanged information units may be metered for a PDP context session, as opposed to metering the duration of the PDP context session, an SSF module may still report usage to an SCF module at predetermined time intervals, so that the SCF module can receive up-to-date usage information. Such up-to-date usage information may be desirable for long PDP context sessions with relatively low data traffic. For example, the tariff switch time specified by IE 1106 may be used as an interval at which to report to the SCF module the amount of time used (where this amount of time has been converted from the number of information units exchanged). It may be desirable to use the tariff switch time for the reporting interval because the charging rate may change after the tariff switch time has elapsed, and the SCF module may be configured to provide updated information to the SSF module in accordance with the change of charging rate.

IE 1112 specifies a count metering downlink/uplink ratio to be applied to a count threshold. The term "uplink" as used herein refers to a direction of transmission of a packet exchanged as part of a PDP context session, where the packet originated from the MT of the subscriber for which the PDP context session is being implemented. As used herein, the term "downlink" refers to a direction of transmission of a packet exchanged as part of a PDP context session, where the packet is to be terminated at the MT of the subscriber for which the PDP context session is implemented. Thus, the count metering downlink/uplink ratio specifies the ratio of downlink packets of the PDP context session to uplink packets of the PDP context session. The SSF module 362 may be configured to apply this ratio in allocating downlink and uplink information units to a downlink count threshold and an uplink count threshold, respectively, and then separately meter the number of downlink information units and the number of uplink information units and compare each number to the appropriate count threshold. In response to the downlink count threshold or the uplink count threshold being reached, the SSF module may be configured to re-allocate the remaining information units between a new downlink count threshold and a new uplink count threshold.

IE 1113 may list one or more port addresses (i.e., IP addresses) that have been provisioned to support the APN specified in IE 1101. Each port address may correspond to a port of a PIM (e.g., PIM 344A) of NSS 310.

IE 1115 specifies a charging-type to be used for the APN specified by IE 1101. In some cases, the value for the charging type may be overridden by the charging-type specified in IE 1014 for a specific subscriber. The value stored in IE 1115 may determine whether or not the value itself can be overridden by IE 1014. For example, IE 1115 may specify an all-prepaid charging type (e.g., real-time prepaid or hot billing) that defines that any PDP context session for the APN will have prepaid charging applied, regardless of the value specified in IE 1014 for a subscriber. IE 1115 also may specify an all-postpaid charging type that specifies that any PDP context session established for this APN will have postpaid charging applied, regardless of the value specified by IE 1014 for a specific subscriber. IE 1115 also may specify a combined charging type that indicates that the charging type will be determined by IE 1014 for each subscriber that uses the service represented by the APN defined by IE 1101. IE 1115 may specify other charging types as well.

IE 1114 specifies an APN profile distribution for the APN profile 1101. For example, although a particular network element of the NSS 310, for example, SSR 370, may be the primary location at which the APN profile 1101 is stored persistently, the APN profile 1101 may be distributed or provisioned to one or more other network elements of NSS 310. For example, APN profile 1101 may be provisioned to SSF module 362. Further, the complete APN profile data structure 1100 may be provisioned to one or more other network elements such as SSF module 362. Further, the PDP context profile data structure 1000, and/or one or more PDP context profiles 1001 thereof, also may be provisioned to one or more networked elements of NSS 310, for example, SSF module 362. In a case where a PDP context profile 1001 and/or an APN profile 1101 are stored on the SSF module, then, in response to a request to establish a PDP context session for the PDP context profile, the SSF module may not have to exchange communications with the SSR 370 to obtain the PDP context profile and/or a corresponding APN profile to establish the PDP context session. Storing a PDP context profile and/or an APN profile on the SSF module 362 prior to reception of a PDP context request may be referred to herein as "static provisioning." Provisioning a PDP context profile or an APN profile to an SSF module in response to a request to establish a PDP context session may be referred to herein as "dynamic provisioning." IE 1114 may specify whether static provisioning or dynamic provisions is to be used for the APN of APN profile 1100.

Returning to FIG. 6, it should be noted that SSR 370 may be included in its entirety as part of PIM 344A. Further, at least a portion of SSR 370 may be included in SIR 150. For example, at least a portion of subscriber services information 371, which may include one or more PDP context profiles 1001 and/or one or more APN profiles 1101, may be included as part of SIR 150.

In response to a subscriber attempting to initiate a session for a service, service support module 361 of PIM 344A may download (if not already stored on PIM 344A), from the SSR 370, service information 374, which may include the subscriber packet-switched INS information 372 along with other subscriber services information 371. Subsequently, in response to a triggering event for a service (e.g., a time or volume threshold being reached, a tariff switch time, or a termination of the session), the SSF module 362 may initiate communications with the SCF module 148 in accordance with information 374 to request and receive instructions and information relating to the triggering event.

SSF module 362 may be configured to communicate with the SCF module 148 to implement prepaid charging for a packet-switched service provided by a node of a PDN. For example, in response to PIM 344A receiving a request to establish a PDP context session from a subscriber, the SSF module 362 may send a circuit-switched-INS packet 147 to SCF module 148 to request INS instructions and information for the session. The circuit-switched INS functionality 149 may determine the instructions and information, and the SCF module 148 may send a circuit-switched-INS packet 147 including such instructions and information to the SSF module 362.

If the INS is prepaid charging, the packet 147 sent by the SCF module 148 may include information for implementing prepaid charging. The SSF module 362 may be configured to receive such information and to implement prepaid charging accordingly. Further, the SSF module 362 may be configured to communicate with the SCF module 148 throughout the session in response to one or more other triggering events and/or at predetermined intervals.

SSF module 362, SCF module 148 and SSR 370 may be configured to exchange communications and implement an INS as described below in relation to FIGS. 9, 10A and 10B, including exchanging information described in relation to FIGS. 11-14.

In an embodiment, NSS 310 includes a server-based application that includes the service intelligence and logic to enable network operators to develop, deploy, manage, and provision INSs while containing operational costs. Such server-based application, and portions thereof, may reside on one or more of the modules (e.g., 362, 148, 150 and 370) of NSS 310. In an embodiment, such server-based application is the Senteon Service Core available from WaterCove Networks, Inc. One or more nodes of the MCN illustrated in FIG. 6, including one or more MTs such as 18A, may be configured with a client side of such server application.

NSS 310, and components thereof such as registers 150 and 370 and modules 136A and 344A, may be implemented using software (e.g., C, C++, Java, or a combination thereof), hardware (e.g., one or more application-specific integrated circuits), firmware (e.g., electrically-programmed memory) or any combination thereof. One or more of the components of NSN 310 may reside on a single machine (e.g., a node of NSN 310), or each component may reside on a different machine. Further, each component may be distributed across multiple machines, and one or more of the machines may be interconnected.

Further, on each of the one or more machines that include one or more components of NSN 310, each of the components may reside in one or more locations on the machine. For example, different portions of the components 136A, 150, 344A and 370 may reside in different areas of memory (e.g., RAM, ROM, disk, etc.) on the machine. Each of such one or more machines may include, among other components, a plurality of known components such as one or more processors, a memory system, a disk storage system, one or more network interfaces, and one or more busses or other internal communication links interconnecting the various components.

In an embodiment, NSS 310 may be implemented in accordance with the Mobile Data Service System and/or the Flow-Core System Architecture developed by Watercove Networks, Inc of Chelmsford, Mass. The Mobile Data Service System and Flowcore are described in more detail in Purpose-Built Architecture Required for Mass-Market Deployment of Personalized Data Services and Exploiting the Opportunities for Personalized Mobile Data Services, whitepapers from WaterCove Networks, Inc. of Chelmsford, Mass., the entire contents of both of which are hereby incorporated by reference.

NSS 310 is an illustrative embodiment of an NSS for implementing a packet-switched INS for packet-switched services on an MCN. Such an illustrative embodiment is not meant to limit the scope of the invention and is provided for illustrative purposes, as any of a variety of other NSSs for implementing INSs for packet-switched services on an MCN, for example, variations of NSS 310, may fall within the scope of the invention.

2. Implementing Prepaid Charging for Packet-Switched Services

Figure 9:
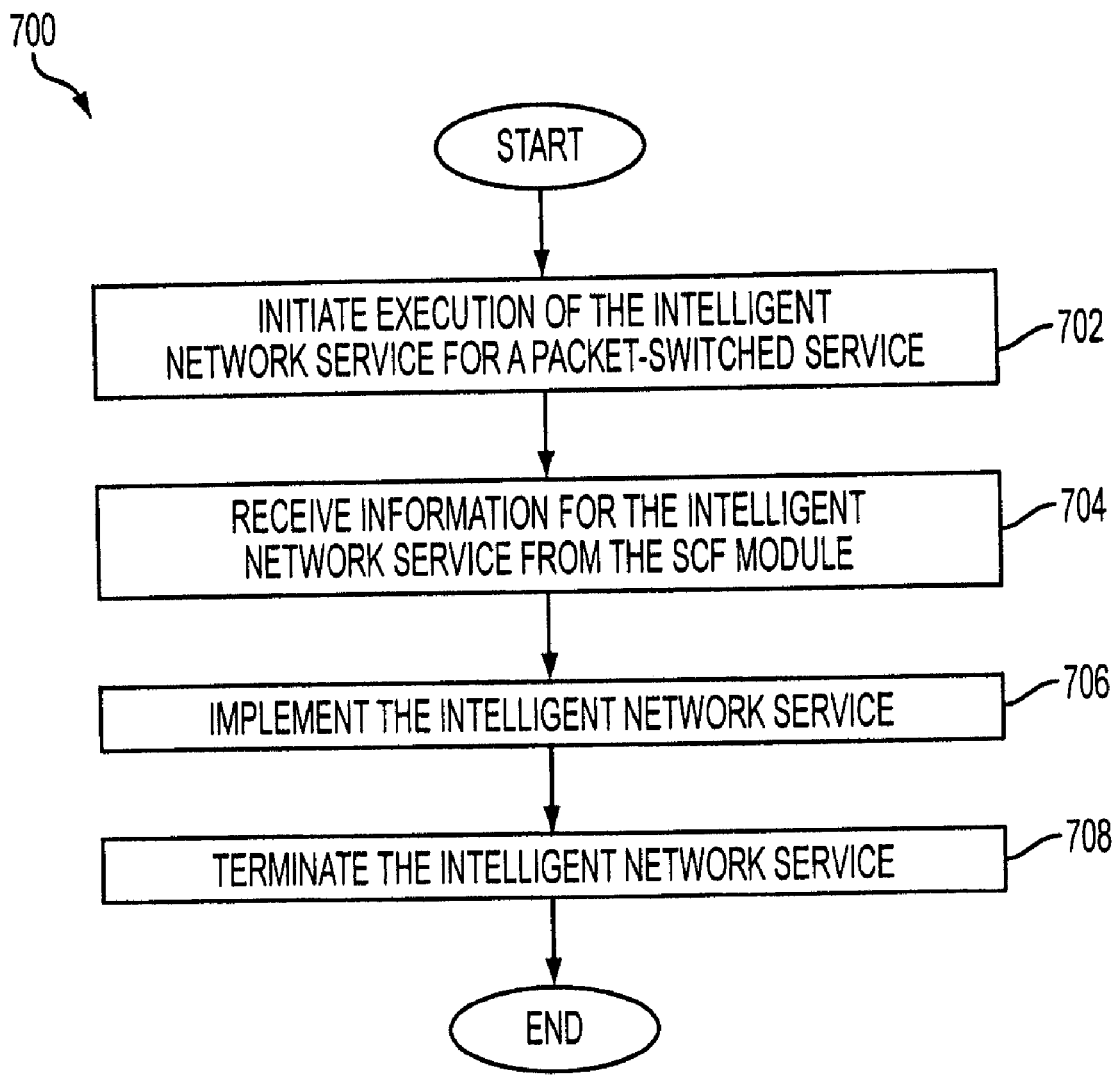
FIG. 9 is a flow chart illustrating an example of a method of implementing an intelligent network service for a packet-switched service on a PDN interface module of a mobile communications network.

FIG. 9 is a flowchart illustrating an example of a method 700 for implementing an INS for packet-switched services on a module of an MCN. Such a module may be a PIM such as PIM 344A or a PSM.

In Act 702, the execution of an INS for a packet-switched service is initiated. For example, a request may be received to create a PDP context session for a packet-switched service between a subscriber of the MCN and a node of a PDN.

In response to receiving the request, a SSR, for example, SSR 370, may be accessed to determine if the subscriber subscribes to one or more INSs. For example, SSF module 362 may receive a session packet 160, and, in response, service support module 361 may access SSR 370, which may access subscriber packet-switched-INS information 372 to determine INSs, if any, to which a subscriber is subscribed. The subscriber packet-switched-INS information 372 also may indicate the identity and location of an SCF module to exchange communication with to implement an INS. The SSR 370 may specify this information in service information 374 sent to the SSF module 362.

If the subscriber is subscribed to an INS, an initiating packet may be sent to an SCF module corresponding to the INS to initiate the INS for the requested PDP context session.

Next, in Act 704, information for the INS may be received from the SCF module.

In a following Act 706, the INS may be implemented using the received information. Further, additional packets may be exchanged between the PIM and SCF module throughout the implementation of the INS, for example, in response to a triggering event. Optionally, these packets may be exchanged in accordance with a protocol for implementing the INS with circuit-switched voice parameters, and the PIM may be configured to convert the circuit-based parameters to packet-based parameters and vice versa.

In a following act 708, the INS may be terminated. For example, the INS may be terminated in response to an action by the subscriber or another party to the session or may be terminated in accordance with the INS.

Method 700 is an illustrative embodiment of a method of implementing an INS for packet-switched services on a PIM of an MCN. Such an illustrative embodiment is not meant to limit the scope of the invention and is provided for illustrative purposes, as any of a variety of other methods of implementing an INS for packet-switched services on a PIM of an MCN, for example, variations of method 700, may fall within the scope of the invention.

Figure 10A:
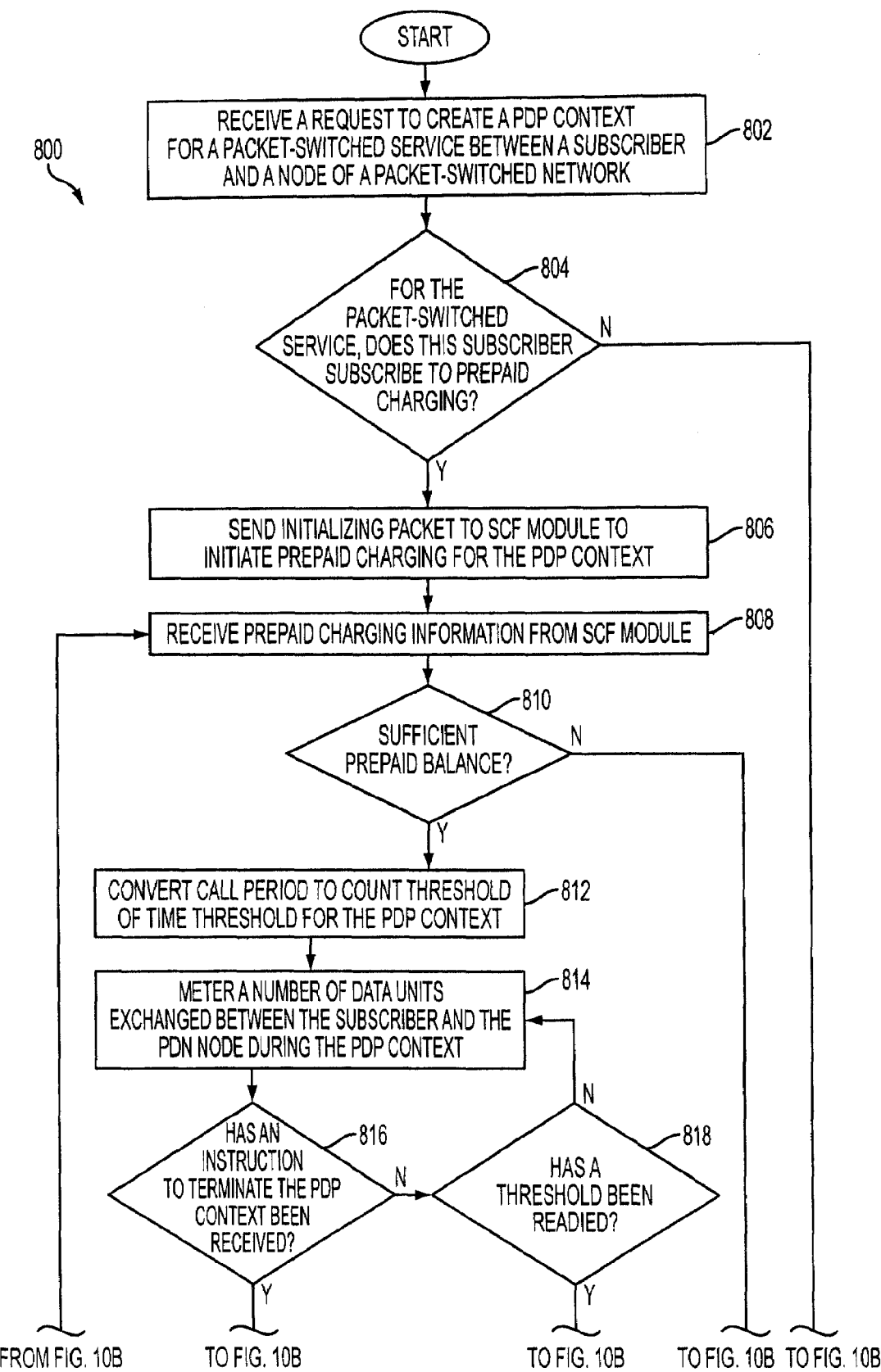
FIGS. 10A-10B are a flow chart illustrating an example of a method of implementing prepaid charging for a packet-switched service on a on a PDN interface module of a mobile communications network.
Figure 10B:
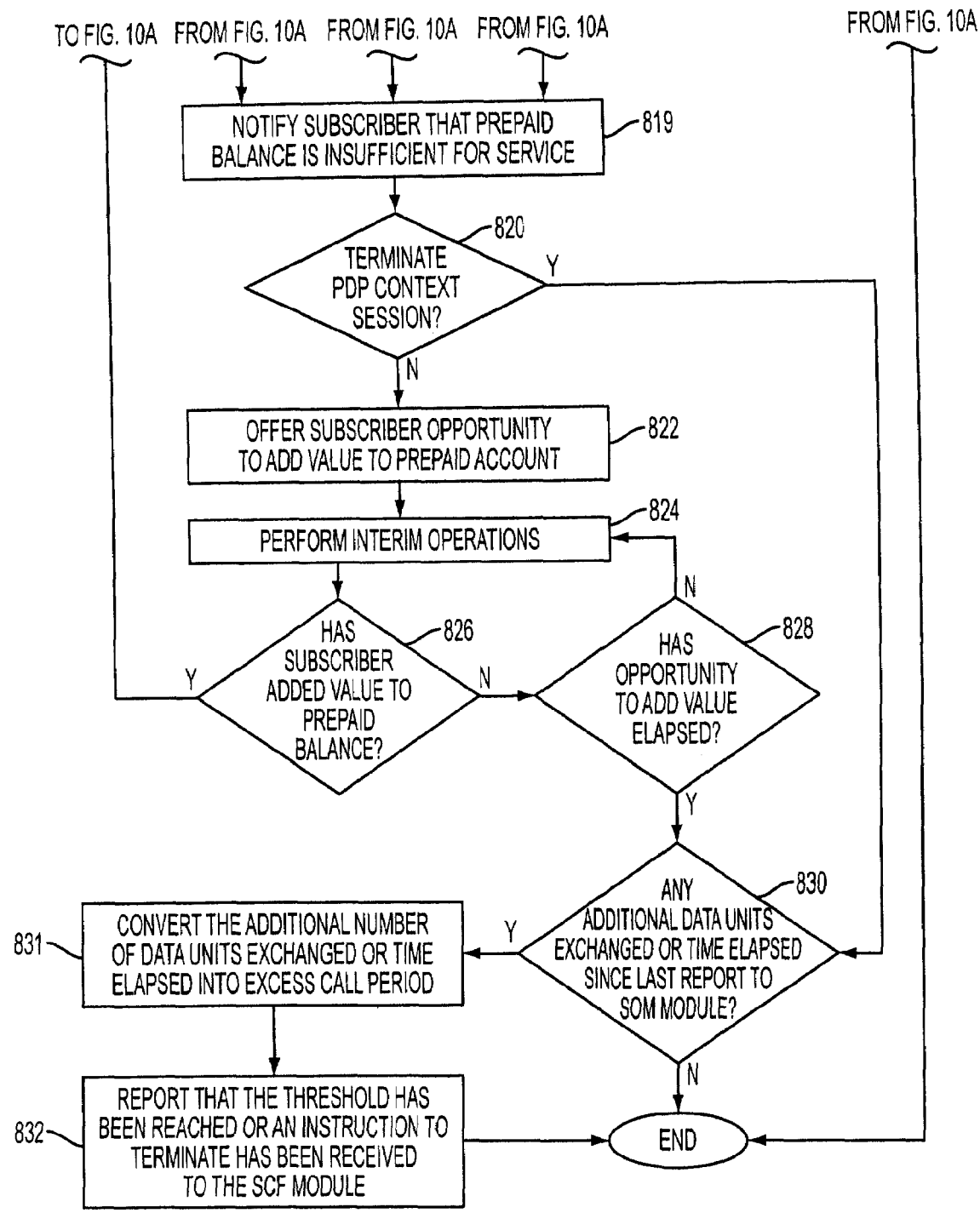
Figure 11:
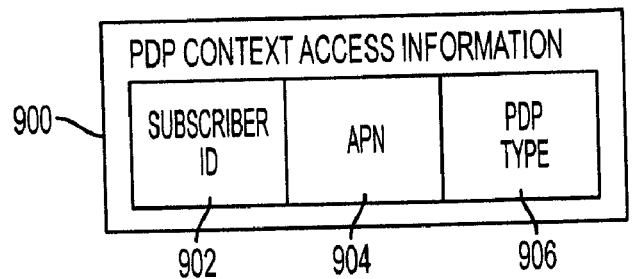
FIG. 11 is a block diagram illustrating an example of PDP context access information for accessing a PDP context profile.

FIGS. 10A-10B are a flow chart illustrating an example of a method 800 of implementing prepaid charging for packet-switched services on a module of an MCN. Such a module may be a PIM such as PIM 344A or a PSM such as PSM 136A. Although method 800 is described below primarily in relation to implementing prepaid charging, other INSs may be implemented using such a method or a variation thereof.

In Act 802, a request to create a PDP context session for a packet-switched service between a subscriber and a node of a PDN may be received. For example, referring to FIG. 6, a subscriber 17A using an MT 18A may transmit a PDP context request to PSM 136A, which forwards the request to PIM 344A. The PDP context request may include PDP context access information 900 illustrated in FIG. 11.

Such information 900 may include one or more information elements (IEs) including subscriber ID IE 902, APN IE 904 and PDP Type IE 906. The subscriber ID IE 902 may specify the IMSI or another unique identifier of the subscriber that originated the request. APN IE 904 may specify the APN for the requested PDP context session. Such APN may be a label in accordance with known DNS naming conventions. The PDP Type IE 906 may specify the type of packet data protocol for the requested PDP context session, for example, IP or PPP.

The combination of subscriber ID IE 902 and APN IE 904 may be used to index the appropriate PDP Context Profile 1001 from PDP context profile data structure 1000, described above in relation to FIG. 7.

In Act 804, it may be determined whether a subscriber subscribes to prepaid charging for the packet-switched service for which a PDP context session is requested. For example, service support module 361 may send a packet to SSR 370 that includes at least IEs 902 and 904 of PDP context access information 900 to determine whether the subscriber subscribes to prepaid charging for the APN specified in the PDP context request. The SSR 370 may access subscriber service information 371 to determine whether the information 371 includes an entry (e.g., a PDP Context Profile 1001) for the specified subscriber and APN. If the information 371 does not include an entry for the specified APN, the SSR 370 may send service information 374 to the service support module 361 indicating that it does not include any information pertaining to prepaid charging. Further, information 374 may indicate that the subscriber is not registered for the requested packet-switched service at all.

If the subscriber service information 371 does include an entry for the specified APN for the subscriber (e.g., a PDP context profile 1001), the service information 374 may include information pertaining to prepaid charging. For example, service information 374 may include one or more (e.g., all) of the IEs of a PDP context profile 1001 corresponding to the subscriber ID and APN specified in PDP context access information 900 transmitted from SSF module 362 to SSR 370. Further, the INS information 374 also may include any of the IEs included in an APN profile 1101 corresponding to the APN specified in information 900.

As discussed above in relation to IE 1114, an APN may be defined such that the APN is dynamically distributed to one or more elements, for example PIM 344A, of NSS 310. Accordingly, service support module 361 may perform Act 804 without accessing SSR 370 if the specified PDP context profile and/or APN profile have been dynamically distributed to service support module 361 before the request is received in Act 802.

In Act 804, if it is determined that the subscriber does not subscribe to prepaid charging for the packet-switched service, then prepaid charging may not be implemented for the packet-switched service.

In Act 804, if it is determined that the subscriber subscribes to prepaid charging for the packet-switched service, then, in Act 806, an initializing packet may be sent to an appropriate SCF module (e.g., SCF module 148) to initiate prepaid charging for the PDP context session.

Figure 12:
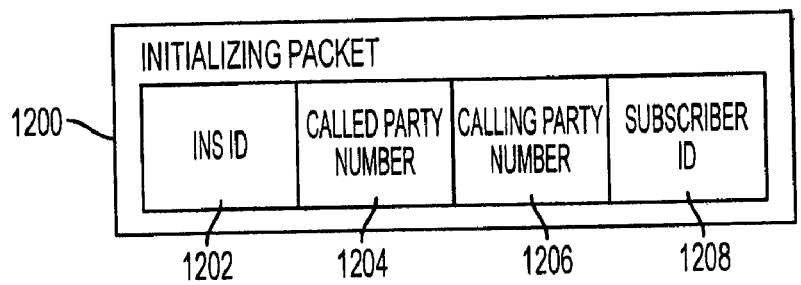
FIG. 12 is a block diagram illustrating an example of an initializing packet for initializing an INS.

For example, SSF module 362 may send initializing packet 1200, illustrated in FIG. 12, to SCF module 148. Initializing packet 1200 may include any of the following IEs: INS ID IE 1202; called party number IE 1204; calling party number IE 1206; subscriber ID IE 1208; and one or more other IEs.

IE 1202 specifies an ID for a set of one or more INSs, which may include prepaid charging, for which the SSF module is requesting implementation. The SCF module may be configured to implement a plurality of INSs, and IE 1202 enables the SCF module to select one or more of the plurality of INSs to implement for the SSF module.

IE 1204 specifies a called party number to used by the SCF module to access the INS subscription information specific to the subscriber for the INS. As discussed above in relation to IEs 1016 and 1104, the called party number may specify a telephone number for the subscriber which is mapped to an APN corresponding to the PDP context session.

IE 1206 specifies a calling party number that specifies the subscriber to the SCF module 148. As described above in relation to IE 1015 of a PDP context profile 1001, if an SCF module such as SCF module 148 is not capable of recognizing a PDP context identifier, then the calling party number may specify a telephone number associated with the subscriber initiating implementation of the INS. IE 1015 maps this telephone number to a PDP context profile 1001 corresponding to a subscriber. If the NSS 310 is an NSS on which both packet-switched services and circuit-switched voice services can be implemented (e.g., a GSM/GPRS network), the telephone number specified by the calling party number 1206 may be a telephone number already assigned to the subscriber for circuit-switched voice services.

IE 1208 specifies an ID for a subscriber, for example, an IMSI.

Returning to method 800, in Act 808, prepaid charging information may be received from the SCF module.

Figure 13:
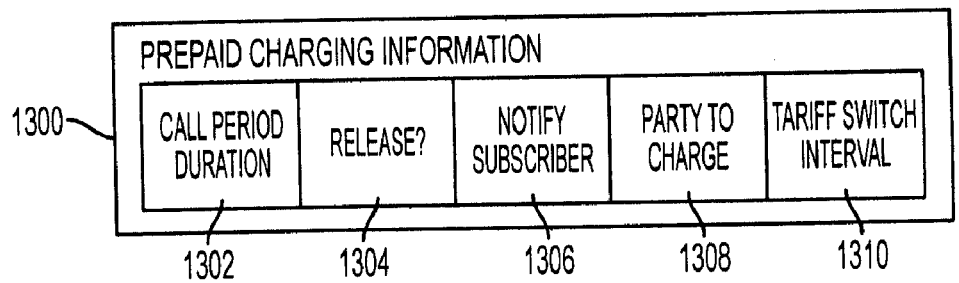
FIG. 13 is a block diagram illustrating an example of prepaid charging information for an Intelligent Network Service.

FIG. 13 is a block diagram illustrating an example of prepaid charging information 1300 that may be transmitted from an SCF module to an SSF module as part of implementing an INS for a PDP context session. The prepaid charging information 1300 may include one or more of the following IEs: call period duration IE 1302; release IE 1304; notify subscriber IE 1306; party to charge IE 1308; tariff switch interval IE 1310; and one or more other IEs.

IE 1302 may specify a call period duration for the PDP context session in accordance with the amount of service prepaid for by the subscriber. IE 1304 is a flag that may specify whether to terminate (i.e., release) the PDP context session if the call period (i.e., the number of information units or elapsed time converted from the call period) has expired.

IE 1306 specifies whether to notify the subscriber that the threshold has been reached before terminating the PDP context session. IE 1306 may be used if IE 1304 indicates to terminate the PDP context session in the event that the call period has expired. If IE 1306 indicates to notify the subscriber, then the service support module 361 may be configured to notify the MT of the subscriber using video content, audio content, data content or a combination thereof, and the MT may be operative to play a sound, play an audio or video message, display a visual message or in some other fashion notify the subscriber that the threshold has been reached. Further, the SSF module and the MT may be operative to allow a subscriber a certain amount of time during which to add value to an account before terminating the PDP context session, as described in more detail below.

The SSF module may send such notification at a predetermined amount of time before the actual PDP context session is terminated, for example, 30 seconds before a PDP context session is terminated. Thus, the SSF module may be configured to recognize when the number of information units or amount of time remaining for the PDP context session is equivalent to an amount of time (e.g., 30 seconds) before the call period would expire, and to notify the subscriber of the imminent termination in response to such recognition.

IE 1308 may specify a party to charge for the PDP context session. For example, IE 1308 may specify the subscriber's IMSI or another identifier of the subscriber. Further, IE 1308 may specify another party associated with the subscriber for which to charge. The value specified by IE 1308 should match the value specified by IE 1406 discussed in more detail below in relation to FIG. 14.

IE 1310 may contain information defined in IE 1106 of an APN profile 1100 for the service being provided, and may be combined with or overridden by information defined in a corresponding IE of a PDP context profile 1000 for the subscriber and service.

In Act 810, it may be determined whether the subscriber has a sufficient prepaid balance for the requested packet-switched service. For example, the prepaid charging information received in Act 808 may indicate that the subscriber does not have a required minimum balance in the subscriber's prepaid account for the service associated with the PDP context session.

Returning to method 800, in Act 810, if it is determined that the PDP context session is not to be terminated, then in Act 812 the call period may be converted to a count threshold or elapsed time threshold for the PDP context session. The SSF module may use a variety of techniques for converting the call period. If the charging type for the PDP context session, specified by IE 1014, is time-based (e.g., time-based prepaid charging), the SSF module may merely use the call period as the elapsed time threshold or may apply a function, possibly as simple as multiplying by a factor, to convert the call period to an elapsed time threshold.

If the charging type for the PDP context session specified by IE 1014 is count-based prepaid charging, then Act 812 may include applying the time-to-count conversion ratio specified by IE 1107 of the APN profile 1101 corresponding to the PDP context session. For example, the time-to-count conversion ratio may specify that 1 second of call period translates to 56 kilobytes. Accordingly, if a subscriber has prepaid for 10 minutes of the PDP context session, then the count threshold count for the PDP context session will be 33.6 megabytes.

If the specified charging type for the PDP context session is count-based prepaid charging, then Act 812 also may include allocating the count threshold between an uplink count threshold and a downlink count threshold, for example, in accordance with IE 1112 of the APN profile 1101 corresponding to the PDP context session.

For example, referring to FIG. 6, for a PDP context session between a subscriber 17A using an MT 18A and PDN node 66, after receiving a count threshold from SSF module 662, PIM 344A may meter the number of information units exchanged by incrementing the accumulative number of information units received as part of forwarding uplink session packets 160 and compare the accumulative number to the uplink threshold count, and may separately meter the number of information units received as part of forwarding downlink session packets in the same manner. If either the uplink or the downlink threshold count is reached, the PIM 344A may report both uplink and downlink usage to the SSF module 362, and if the combined usage is still smaller than the original total count threshold converted from the call period received from the SCF module 148, the SSF module may be configured to re-allocate the remaining information units between a new uplink threshold count and a new downlink threshold count.

In Act 814, the duration of the PDP context session and/or a number of information units exchanged between the subscriber and the PDN node during the PDP context session may be metered. Act 814 may include applying the count metering unit specified by IE 1108 to determine what unit to use for metering. Thus, the SSF module may meter the number of information units exchanged (e.g., bytes, kilobytes, packets or transactions) during a PDP context session.

Although not illustrated in method 800, a prepaid charging report (e.g. prepaid charging report 1400) may be generated by a session support module (e.g., session support module 363) at predefined periods (e.g., based on IEs 1302 and/or 1310 described above) or in response to a triggering event. Such report may transmitted to a service support module (e.g., service support module 361) and may be transmitted by an SSF module (e.g. SSF module 362) to an SCF module (e.g., SCF module 148) The metered number of information units exchanged or time elapsed may be converted to a call period. For example, the inverse function of the function applied in Act 812 may be applied to produce the call period. Such a conversion may be made by applying the reverse ratio of the ratio specified by IE 1107 of the APN profile 1101.

Figure 14:
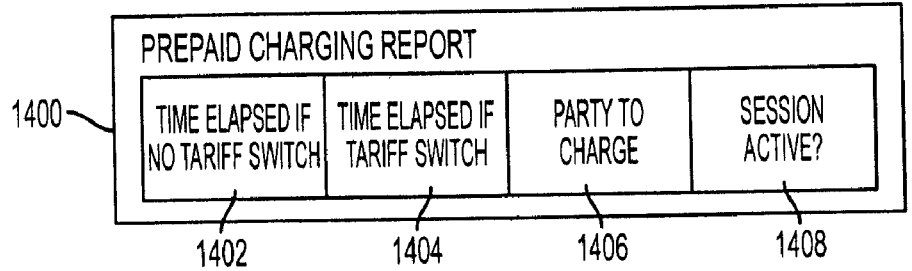
FIG. 14 is a block diagram illustrating an example of a prepaid charging report that may be transmitted from an SSF module to an SCF module.

FIG. 14 is a block diagram illustrating an example of a prepaid charging report 1400. Prepaid charging report 1400 may include one or more of the following IEs: time elapsed if no tariff switch IE 1402; time elapsed if tariff switch IE 1404; party to charge IE 1406; session active IE 1408; and one or more other IEs.

Depending on the type of prepaid charging and whether a tariff switch has occurred, either IE 1402 or 1404 may specify how much time has elapsed since the last prepaid charging report, or since the beginning of the PDP context session, or since the last tariff switch. If the type of prepaid charging for the PDP context session is time-based prepaid charging and a tariff switch has occurred since the last prepaid charging report 1400 was sent (which may be the reason why the prepaid charging report is being sent), then IE 1404 may specify the elapsed time since the last tariff switch.

If the type of prepaid charging for the PDP context session is time-based prepaid charging, but no tariff switch has occurred since the last prepaid charging report was transmitted, or if the type of prepaid charging is count-based prepaid charging, then IE 1402 will specify the time elapsed since the last prepaid charging report, or since the beginning of the PDP context session, or since the last tariff switch. The time elapsed may be the result of a conversion from a time or count threshold as described above.

The SSF module may be configured to send a prepaid charging report 1400 (e.g., to a service support module and/or an SCF module) for other reasons besides the reaching of a threshold or the occurrence of a tariff switch. For example, the session support module 363 and/or the SSF module may be configured to generate a prepaid charging report 1400 at periodic intervals during the metering of the number of information units exchanged for a PDP context session.

For example, the session support module and/or SSF module may be configured to generate a prepaid charging report 1400 at periodic intervals equal to the interval of a tariff switch if: a) the type of charging for the PDP context session as specified by IE 1014 is count-based prepaid charging; b) IE 1106 for the APN of the PDP context session specifies a tariff switch time for the APN; and c) IE 1110 for the APN specifies that time-based reporting is to be utilized. Accordingly, at the occurrence of a tariff switch during the PDP context session, the session support module and/or the SSF module will report the amount of time elapsed since a last prepaid charging report was transmitted using IE 1402 of a prepaid charging report 1400.

IE 1406 specifies a party to charge for the PDP context session. As described above IE 1406 should match IE 1308 of prepaid charging information 1300 corresponding to the PDP context session.

IE 1408 specifies whether the PDP context session is still active or the report 1400 was generated and transmitted as a result of the PDP context being terminated.

Returning to method 800, in Act 816, it may be determined whether an instruction to terminate the PDP context session has been received. For example, the SSF module may receive an instruction to terminate the PDP context session from the MT of the subscriber.

In Act 816, if it is determined that an instruction to terminate the PDP context session has been received, then the method proceeds to Act 819, described below. Although Act 816 illustrates determining whether such instruction has been received at a particular point during performance of method 800, it should be understood that at any point during the method 800, such an instruction may be received and the method may proceed to Act 819.

If it is determined in Act 816 that an instruction to terminate the PDP context session has not been received, then in Act 818, it may be determined whether a threshold has been reached, or, alternatively, whether a threshold is close to being reached. For example, it may be determined whether a time threshold for the duration of the PDP context session has been reached and/or a count threshold (i.e., a total of a combination of an uplink count threshold and a downlink count threshold) has been reached. Although Act 818 is illustrated as occurring at a particular point during performance of method 800, it should be understood that the threshold being reached is an event that may occur at any point during performance of method 800.

If it is determined that a threshold has not been reached, then method 800 may return to Act 814. If it is determined in Act 818 that a threshold has been reached (or is close to being reached) then processing may continue to Act 819.

In Act 819 the subscriber may be notified that the prepaid balance is insufficient for the service. The manner in which such notification is performed may be determined based on several factors. The subscriber may be notified using any of a variety of techniques, including any of the techniques described in the Tubinis application.

In a following Act 820, it may be determined whether to terminate the PDP context session because of the insufficient balance. Such determination may be made in accordance with IE 1304 described above in relation to FIG. 13. Such determination may be made, additionally or alternatively, on other factors, for example, based on any of a variety of factors described in the Tubinis application.

If it is determined in Act 820 to terminate the PDP context session, then processing continues to Act 830.

In Act 830, it may be determined whether any additional information units have been exchanged or time has elapsed since the last report was transmitted to the SCF module. As will be described in more detail below, at periodic intervals during the duration of the PDP context session and/or in response to an event, an SSF module (e.g., SSF module 362) may report usage information (e.g., information units exchanged or time elapsed) to the SCF module. During the interim in which the SSF module is waiting for a response from the SCF module, time has elapsed and more information units may have been exchanged or more time may have elapsed. The time elapsed and/or number of information units exchanged may be metered by metering module 365. Accordingly, the metering module 365 may meter the amount of information units exchanged or the time elapsed since the last report was transmitted. The metering module 365 may periodically record the time elapsed or information units exchanged to the SSF module 362. The frequency and timing of such reports may be synchronized with the usage reported by the SSF module 362 to the SCF module 148, or may be different.

If the service support module 361 already established the PDP context session and/or the session support module 363 already began exchanging packets for the session, then, in Act 831, the conversion module 366 may convert the additional number of information units exchanged or time elapsed to an excess call period. Converting from information units or time elapsed to a call period is described below in more detail in relation to Act 826.

In a following Act 832, as part of sending a prepaid charging report (e.g., prepaid charging report 1400), the session support module 363 and/or the SSF module 362 may report that an instruction to terminate has been received or that a threshold has been reached, and report the excess call period to the SCF module.

If in Act 830 it is determined that no additional information units were exchanged or time elapsed, for example, because the service support module 361 did not yet establish that PDP context session, then method 800 ends.

Returning to Act 820, if it is determined in Act 820 that the PDP context session is not to be terminated, then in Act 822 the subscriber may be enabled an opportunity to add value to the prepaid account for the service. The manner in which such opportunity may be enabled may depend on several factors and using any of a variety or techniques, for example, as described in the Tubinis application.

In a next Act 824, interim operations may be performed while the subscriber is provided the opportunity to add value to the prepaid account. Several different types of interim operations may be performed, and the manner in which the interim operations are performed may depend on several factors, for example, as described in the Tubinis application.

In Act 826, it may be determined whether the subscriber has added value to the prepaid balance for the service. If the subscriber has added value, then processing continues to Act 808, described above.

If it is determined that the user has not added value to the prepaid account, then, in Act 828, it is determined whether the opportunity to add value has elapsed. The duration for which the subscriber has an opportunity to add value to the prepaid account may be based on value stored in another IE of APN profile 1101 for the service and/or a value stored in PDP Context profile 1001 for the subscriber and service.

If it is determined that the opportunity to add value has elapsed, then processing may proceed to Act 830 described above. If it is determined that the opportunity to add value to the account has not elapsed, then processing may proceed to Act 824.

It should be noted that although Acts 822, 824, 826 and 828 are illustrated as occurring sequentially, any combination of these Acts may occur concurrently, as the processing described by these Acts may be event-based processing which may occur in response to events. For example, a message may be played or displayed on a display screen of the MT of the user offering the subscriber an opportunity to add value to the prepaid account while interim operations are being performed. Any time during which this opportunity is being offered to the subscriber and the interim operations are being performed, a notification may be received that the user has added value to the prepaid balance or the opportunity to add value has elapsed.

Returning to act 810, if it is determined in Act 810 that the subscriber does not have a sufficient prepaid balance for the requested service, then processing may continue to Act 819, described above Method 800 may include additional acts. Further, the order of the acts performed as part of method 800 is not limited to the order illustrated in FIGS. 10A-10B as the acts may be performed in other orders, and one or more of the acts of method 800 may be performed in series or in parallel to one or more other acts. For example, as described above, Acts 816 and 818 may be performed at any point during performance of method 800. Further, method 800 may include additional acts.

Method 800 is an illustrative embodiment of a method of implementing prepaid charging for packet-switched services on a module of an MCN. Such an illustrative embodiment is not meant to limit the scope of the invention and is provided for illustrative purposes, as any of a variety of other methods of implementing an INS for packet-switched services on a PIM of an MCN, for example, variations of method 800, may fall within the scope of the invention.

3. Home-based Prepaid Charging

Configuring PIM 344A with SSF module 362 to implement an INS, as opposed to configuring PSM 136A with such an SSF module, enables the MCN that includes NSS 310 to implement the INS for subscribers roaming in other MCNs, for example, MCN 4.

Further, for one or more subscribers of the MCN, an entry of SIR 150 for the subscriber (e.g., as part of subscriber administration, location and non-INS information 152) may be defined such that if the subscriber roams into a visited MCN and initiates a session (e.g., PDP context session) with a node located on a PDN, the session will be established using a PIM (e.g., PIM 344A) of the home MCN. For example, a subscriber entry may have an IE that stores a value indicating whether (or not) to use a PIM of the home MCN (e.g., the home PIM) to establish a session while roaming in another MCN. This IE may simply store a single bit set to "1" or "0". In an embodiment, if the MCN is a GPRS or GSM/GPRS network, the SIR 150 may be an HLR and an entry for a subscriber in the HLR may specify that, if a subscriber is roaming in another MCN, then use a specified GGSF module of the MCN to establish a session with a PDN node.

Such a subscriber entry may store additional information to assist a PSM of a visited MCN to establish a session with the home PIM. For example, a subscriber entry may include another IE that stores an identifier of the MCN (or the operator of the MCN). Such an identifier may be a name to associate with the home MCN, for example, "orange.uk.gprs." A visited PSM then could use this information to determine the location of the home PIM, as is described below in more detail.

Subsequently, when a PSM of a visited MCN retrieves the subscriber information from the SIR of the home MCN in response to an attach request by the subscriber, the PSM may determine that a home PIM is to be used for sessions with the PDN, as opposed to using a PIM of the visited MCN. Further, the visited PSM may determine the location of the home PIM from the home MCN ID. In response to the visited PSM later receiving a request from the roaming subscriber to establish a session, the PSM may use the home PIM to establish such a session.

Referring to FIG. 6, SIR 150 may include an entry for subscriber 17A as part of information 152. This entry may include a roaming PDN access IE (not shown), which indicates whether a visited PSM (e.g., PSM 54) of a visited MCN is to use a home PIM to establish a session with any nodes (e.g., PDN node 66) on a PDN if the subscriber 17A roams into the visited MCN. To assure that the home PIM (e.g., PIM 344A) is used to establish any sessions, the roaming PDN access IE can be configured with a value indicating that, if the subscriber 17A roams into another MCN, the visited MCN is to use the home PIM to access any nodes on a PDN.

The subscriber entry of SIR 150 also may include a home MCN identifier IE storing a value (e.g., a name) specifying the MCN of the subscriber. This home MCN identifier may be combined with a network identifier to form an APN that maps to a PIM of the home MCN (e.g., PIM 344A), as described below in more detail.

Subscriber 17A's MT 18A may be configured to determine when it has roamed into MCN 4 using known techniques. After MT 18A has made such determination, MT 18A may send an attach request to PSM 54 requesting attachment to MCN 4. Such an attach request may include an IMSI of the subscriber.

In response to receiving the attach request, the PSM 54 may use the IMSI to determine the home SIR 150 of the subscriber using known techniques. The PSM 54 may exchange communications with the SIR 150, including downloading subscriber information 156 for the subscriber. Subscriber information 156 may include a roaming PDN access value (e.g., retrieved from a roaming PDN access IE) specifying that, if the subscriber 17A roams into a visited MCN, then the visited MCN is to use a home PIM of the home MCN, as opposed to a PIM (e.g., PIM 52) of MCN 4, to establish any PDP context sessions. Subscriber information 156 also may include a home MCN ID (e.g., a name) identifying the home MCN (e.g., retrieved from home MCN ID field), which may be combined with a network ID to form an APN that maps to PIM 344A, as described below in more detail. PSM 54 may persist this information, for example, on a Visitor Location Register (VLR), for later use.

After the attach is complete, subscriber 17A may attempt to establish a PDP context session by sending a PDP context request to PSM 54. This request may include an APN that specifies a network ID (e.g., a name) of PDN 6. For example, the network identifier may be "AOL.com". If the roaming PDN access value of subscriber information 156 specifies not to use a home PIM if the subscriber 17A roams into a visited MCN, then the PSM 54 may communicate with another network resource (e.g., a Domain Name System (DNS) Server) to resolve the subscriber-specified APN to an IP address of a PIM. For example, MCN 4 may be an MCN operating in Germany, and PSM 54 may query a DNS server in Germany with the APN value "AOL.com". The German DNS may resolve this APN value to PIM 52, which the PSM 54 then uses to establish the session with AOL.com.

As described above, however, the roaming PDN access value of subscriber information 156 specifies to use a home PIM of the home MCN if the subscriber 17A roams into a visited MCN. The PSM 54 may be configured such that if the PDN access value specifies to use a home PIM when roaming, the PSM 54 combines the subscriber-specified APN with the home MCN ID included in subscriber information 156, and then queries a DNS server with the combined value. For example, if the subscriber-specified APN is "AOL.com" and the home MCN ID is "orange.uk.gprs," the PSM 54 may combine these values to form "AOL.com.orange.uk.gprs." PSM 54 then may query the same DNS server with "AOL-.com.orange.uk.gprs.", which may resolve the name to the IP address of PIM 344A. PSM 54 may use other techniques to determine the PIM for which to exchange communications to establish a PDP context session in response to a request from a roaming subscriber.

PSM 54 then may initiate communications with PIM 344A to establish the PDP context session requested by subscriber 17A. If PIM 344A is configured with an SSF module 362, the PIM 344A may implement one or more INSs as described below in relation to FIGS. 9, 10A and 10B.

By configuring a PIM and SIR as described above, one or more INSs, including prepaid charging, can be implemented for packet-switched services for a subscriber of an MCN as the subscriber is roaming in an MCN other than the subscriber's home MCN (i.e., a visited MCN).

4. Toggling Implementation of an Intelligent Network Service

Referring to FIG. 6, in an embodiment of the invention, PSM 136A may be configured to implement one or more packet-switched INSs (e.g., prepaid charging). For example, PSM 136A may be configured with an SSF module 262 as described for PSM 236A of FIG. 5, or may be configured with SSF module 362 as described for FIG. 6.

In such an embodiment, both the PSM 136A and the PIM 344A of NSS 310 may be configured to implement the same packet-switched INS for a particular subscriber. To control which module, PSM 136A or PIM 344A, implements such packet-switched INS for the subscriber, SIR 150 may include an INS active flag (not shown) for the packet-switched INS as part of the subscriber's information. The INS active flag may be set to a certain value (e.g., logical one) if the PSM is to implement the packet-switched INS for the subscriber, and it may be set to another value (e.g., logical zero) if the PSM 136A is not to implement the packet-switched INS. It should be noted that an INS active flag may be used to enable or disable a packet-switched INS for a subscriber regardless of whether PIM 344A is configured to implement the packet-switched INS.

An INS active flag may be included as part of a subscriber packet-switched INS information of SIR 150, such as packet-switched INS information 254 described above in relation to SIR 250 of FIG. 5. For example, if the MCN is a GPRS, GPRS/GSM or UMTS network, PSM 136A may be an SGSF module configured to implement a packet-switched INS for a subscriber in accordance with CAMEL Phase 3 and the SIR 150 maybe an HLR configured to include a csi-Active flag, defined by CAMEL Phase 3, to enable/disable the packet-switched INS for the subscriber.

PIM 344A, or another module of NSS 310, may be configured to enable the network administrator or another person to set an INS active flag such that a packet-switched INS for a subscriber is enabled for implementation by the PSM 136A. Such module also may be configured to enable such administrator or person to clear an INS active flag for a subscriber such that the packet-switched INS is disabled for implementation by the PSM 136A. The PSM 344A may be configured to set/clear an INS active flag for a subscriber at any time before, during or after the duration of a particular PDP context session during which the corresponding packet-switched INS is provided.

It should be noted that although INS active flags are discussed herein primarily with respect to individual INSs for individual subscribers, a single INS active flag may be used to enable/disable: multiple INSs for a single subscriber; a single INS for multiple subscribers; or multiple INSs for multiple subscribers.

If the PSM 136A is configured to implement one or more packet-switched INS for a subscriber (e.g., the PSM 136A includes an SSF module), then in response to receiving an attach request from the subscriber, the packet sent from the PSM 136A to the SIR 150 to request subscriber information may include an indication that the PSM module 136A is configured to implement the one or more packet-switched INSs for the subscriber. Such packet may include an separate indication for each INS, where each indication may be different, or may include a single indication for multiple (e.g., all) INSs.

For each packet-switched INS, the SIR 150 may be configured to access the corresponding INS active flag for the subscriber. The SIR 150 may be configured to download subscriber packet-switched INS information as part of the subscriber info 156 for each of the one or more INSs for which the INS active flag is set. Further, the SIR 150 may be configured to not include any subscriber packet-switched INS information as part of the subscriber info 156 for each of the one or more INSs for which the INS active flag is cleared.

Alternatively, subscriber packet-switched INS information may be included in the subscriber info 156 regardless of the value of one or more INS active flags. The PSM 136A may be configured such that, for each packet-switched INS that the PSM 136A is capable of implementing, it determines whether to implement the packet-switched INS in accordance with the downloaded value of the INS active flag for the packet-switched INS.

If the PSM module 136A implements a packet-switched INS (e.g., prepaid charging) for a subscriber, the PSM module 136A may notify PIM 344A of such implementation. The PSM module 136A may notify the PIM module 344A using any of a variety of techniques, such as by sending a packet to the PIM 344A that includes a flag set to a particular value. For example, PSM 136A may notify PIM 344A by using GTP version 1, as opposed to using GTP version 0 (which it may use if it does not implement the packet-switched INS), to implement the PDP context session for which the packet-switched INS is to be applied. The PIM 344A may be configured to recognize that if GTP version 1 rather than version 0 is used, the PSM 136A is implementing the packet-switched INS, so that the PIM 344A does not.

In another embodiment of the invention, NSS 310 may be configured such that implementation of a packet-switched INS for a PDP context session may be toggled between PSM 136A and PIM 344A during the session. Such toggling, which may occur when a PDP context session is handed off (a.k.a. handed over) between PSMs, is referred to herein as "INS toggling."

There are two basic INS toggling scenarios: 1) toggling from implementation of a packet-switched INS using a PSM to implementation of the INS using a PIM; and 2) toggling from implementation of a packet-switched INS using a PIM to implementation of the INS using a PSM.

Regarding the first scenario, as described above, if the INS active flag is set for a particular packet-switched INS for a subscriber, a PSM (e.g., PSM 136A) may be allowed to implement the INS for a PDP context session implemented by a PIM (e.g., PIM 344A). The session may be handed off to another PSM (of the same or a different NSS and/or MCN) that is not capable of implementing the packet-switched INS, for example, PSM 54 of MCN 4. When the handoff occurs, the implementation of the packet-switched INS by the former PSM may be terminated.

When the new PSM requests the subscriber information for the subscriber, the request does not include an indication that the new PSM is capable of implementing any INS for the PDP context. Thus the subscriber information downloaded from the SIR may not include any subscriber packet-switched INS information, or alternatively, the downloaded subscriber information does include the new PSM subscriber packet-switched INS information, but the new PSM does not use the information.

The new PSM learns, from information exchanged with the former PSM, the PIM that is implementing the PDP context session, and sends a packet to the PIM to maintain the PDP context session.

A PIM (e.g., PIM 344A) may include or have access to a PSM capability list. This capability list may include a list of PSM IDs (e.g., a name mapped to a network address of a PSM) and, for each PIM ID, a flag indicating whether the PSM is capable of implementing one or more packet-switched INSs. The PSM capability list may be stored at any of several location accessible by the PIM 344a, for example, in the SSR 370.

Optionally, the PSM capability list may be more granular than as described above. Specifically, there may be a separate such list for each subscriber, for each INS or for each INS for each subscriber. Alternatively, a single PSM capability list may have entries that store such information and thus may be indexed or sorted according to subscriber and/or INS.

In response to receiving the packet from the new PSM, the PIM may determine if the new PSM is implementing the packet-switched INS. This determination may be made by examining the received packet, which may include a flag whose value indicates whether the new PSM is implementing the packet-switched INS, as described above. Alternatively, the PIM may first access the PSM capability list, described above, and determine whether the new PSM is capable of implementing the packet-switched INS for the subscriber. If the capability list indicates that the new PSM is not capable of implementing the packet-switched INS, then there is no need to examine the received packet. If the capability list indicates that the new PSM is capable of implementing the packet-switched INS, then the PIM then may examine the received packet.

If the PIM determines that the new PSM is implementing the packet-switched INS, then the PIM may continue to implement the PDP context session, but not implement the packet-switched INS. Else, if the PIM determines that the new PSM is not implementing the packet-switched INS or is not capable of doing so, then the PIM may begin implementing the packet-switched INS for the PDP context session. Further, based on the identity of the new PSM, the PIM may be configured to take over implementation of the packet-switched INS even if the new PSM is implementing the packet-switched INS.

After the PIM begins implementing a packet-switched INS, it may be desirable not to relinquish such implementation to any PSM until the PDP context session ends. Reasons for not relinquishing may include ease of implementation, reduction of traffic and cost in implementing the packet-switched INS, generation of revenue at the PIM, and possibly for other reasons.

Accordingly, the PIM may be configured to automatically send a packet to the SIR to clear the INS active flag corresponding to a packet-switched INS in response to beginning the implementation of the packet-switched INS. Optionally, in the case where such implementation resulted from a handoff, the PIM may be configured to access the appropriate entry of the PSM capability list corresponding to the former PSM before sending the packet to the SIR. If the entry indicates that the former PSM was capable of implementing the packet-switched INS for the subscriber, then the packet is sent to the SIR to clear the appropriate INS active.

Regarding the second scenario, as described above, if the INS active flag is cleared for a particular packet-switched INS for a subscriber, or if the PSM to which a user attaches is not capable of implementing the packet-switched INS, then the packet-switched INS may be implemented by a PIM. If the packet-switched service is handed-off to a new PSM that is capable of implementing the packet-switched INS and the INS active flag for the packet-switched INS is set, then implementation of the packet-switched INS may be toggled from the PIM to the new PSM as follows.

In one embodiment, the PIM may maintain the packet-switched INS for a packet-switched service while the packet-switched service is being handed off to the new PSM. In response to the handoff, the new PSM may send a request to the PIM to terminate the packet-switched INS so that the new PSM can commence it anew. The PSM then may terminate the packet-switched INS and send a notification of such to the PIM. The PIM then may commence implementation of the INS.

In an alternative embodiment, in response to any handoff, the PIM may terminate execution of the packet-switched INS. In response to the handoff, the new PSM may commence implementation of the packet-switched INS if it is capable and the INS active flag for the packet-switched INS is set, and may notify the PIM of such implementation, as described above. The PIM then may either implement or not implement the packet-switched INS, depending on the actions of the PSM, as described above.

Both of these embodiments for the second scenario require additional configuration of one or more PSMs and/or PIMs. For these reasons, it may be desirable not to toggle implementation of a packet-switched INS for a packet-switched service (i.e., a PDP context session) from a PIM to a PSM. Alternatively, it may be desirable to configure a PIM such that implementation of the packet-switched INS toggles from PSMs to the PIM and the PIM maintains implementation of the packet-switched INS until the for a packet-switched service is terminated. As described above, this toggling restriction may be accomplished in part by configuring the PIM to automatically clear the appropriate INS active flag in response to initiating implementation of a packet-switched INS.

It should be noted that implementation of a packet-switched INS may be toggled to, or maintained by, a PIM as a result of any handoff between packet-switching modules by keeping the INS active flag corresponding to the INS cleared.

Methods 700 and 800, described above in relation to FIGS. 9, 10A and 10B, other methods described above, and acts thereof, respectively, and various embodiments and variations of these methods and acts, individually or in combination may be implemented as a computer program product tangibly embodied as computer-readable signals on a computer-readable medium, for example, a non-volatile recording medium, an integrated circuit memory element, or a combination thereof. Such a computer program product may comprise computer-readable signals tangibly embodied on the computer-readable medium, where such signals define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, or C++, or any of a variety of combinations thereof. The computer-readable medium on which such instructions are stored may reside on one or more of the network elements of NSS 310 described above, and may be distributed across one or more of such network elements.

Having now described some illustrative embodiments of the invention claimed below, it should be apparent to those skilled in the art that the foregoing is illustrative and not limiting, having been presented by way of example only. Numerous modification and other illustrative embodiments are within the scope of one of ordinary skill in the art and are contemplated as falling within the scope of the claims set forth below. In particular, although many of the examples presented herein involve specific combinations of method acts or system elements, it should be understood that those acts and those elements may be combined in other ways to accomplish the same objectives. Acts, elements and features discussed only in connection with one embodiment of a system or method are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

In the claims, all transitional phrases such as "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases as set forth in the United States Patent Office Manual of Patent Examining Procedures, section 2111.03.

What is claims is:

1. A method of implementing an Intelligent Network Service for a packet-switched service on a first mobile communications network having an interface module that serves as an interface for communicating packets between the first mobile communications network and a packet data network external to the first mobile communications network, the method comprising an act of:

(A) implementing the Intelligent Network Service on the interface module for a session between a subscriber of the first mobile communications network and a node located on the packet data network, wherein, when the subscriber roams into a second mobile communications network, the Intelligent Network Service is implemented in the first mobile communications network without coordinating with the Intelligent Network Service of the second mobile communications network such that necessary network elements in the first mobile communications network and the second mobile communications network are configured to enable implementation of the Intelligent Network Service for the roaming subscriber, and wherein the Intelligent Network Service is implemented entirely in the first mobile communications network when the subscriber is roaming in the second mobile communications network and when the second mobile communications network is not configured to implement the Intelligent Network service for packet-switched service for subscribers from the first mobile communications network.

2. The method of claim 1, wherein the mobile communications network includes a service control function module for controlling implementation of the Intelligent Network Service, wherein act (A) further comprises:

exchanging one or more packets between the interface module and the service control function module to implement the Intelligent Network Service for the session.

3. The method of claim 2, wherein act (A) comprises: transmitting a packet from the interface module to the service control function module in response to an event associated with the session.

4. The method of claim 2, wherein the service control function module is operative to implement the Intelligent Network Service for circuit-switched voice services in accordance with at least one of Phase One of Customized Applications for Mobile network Enhanced Logic and Phase Two of Customized Applications for Mobile network Enhanced Logic, wherein the method further comprises an act of:
(B) implementing the Intelligent Network Service for packet-switched services on the interface module in accordance with Phase Three of Customized Applications for Mobile network Enhanced Logic.

5. The method of claim 1, wherein the Intelligent Network Service is prepaid charging.

6. The method of claim 5, wherein the prepaid charging is real-time prepaid charging for obtaining packet data contents.

7. The method of claim 1, wherein the first mobile communications network further comprises a subscriber information register including an entry storing subscriber information for the subscriber to the first mobile communications network, the entry to be accessed in response to the subscriber attaching to the first mobile communications network or another mobile communications network, and wherein the method further comprises an act of:
(B) defining the entry such that if the subscriber roams into a second mobile communications network and initiates a session with a node located on the packet data network, the session is established using the interface module of the first mobile communications network.

8. The method of claim 1, wherein the method further comprises an act of:
(B) metering at the interface module a number of information units exchanged between the subscriber of the first mobile communications network and another party during the session.

9. The method of claim 1, further comprising an act of:
(B) converting, at the interface module, circuit-based parameters to packet-based parameters to implement the Intelligent Network Service.

10. The method of claim 9, wherein act (B) comprises: converting an amount of time to a count.

11. The method of claim 1, wherein the first mobile communications network comprises a General Packet Radio Service network or a Universal Mobile Telecommunications System network, and the interface module is operative to implement a Gi interface between the first mobile communications network and the packet data network.

12. The method of claim 1, wherein the first mobile communications network comprises a General Packet Radio Service network or a Universal Mobile Telecommunications System network, and the interface module comprises at least part of a Gateway General Packet Radio Service Support Function module.

13. The method of claim 1, wherein the first mobile communications network comprises a Code-Division Multiple Access network and the interface module is at least part of a Packet Data Serving Node.

14. The method of claim 1, wherein the first mobile communications network is a home network for the subscriber and wherein the interface module implementing the Intelligent Network Service is provided in the home network.

15. The method of claim 1, wherein the Intelligent Network Service provides a data service in the packet data network.

16. The method of claim 1, wherein, if the subscriber roams into the second mobile communications network and requests a PDP session with the node of the packet data network, the PDP session is established using only the interface module of the first mobile communications network.

17. The method of claim 1, wherein the Intelligent Network Service is implemented only in the interface module of the first mobile communications network.

18. A system for implementing an Intelligent Network Service for a packet-switched service on a first mobile communications network, the system comprising:
an interface module that serves as an interface for communicating packets between the first mobile communications network and is operative to implement the Intelligent Network Service for a session between a subscriber to the first mobile communications network and a node located on a packet data network,
wherein, when the subscriber roams into a second mobile communications network, the Intelligent Network Service is implemented in the first mobile communications network without coordinating with the Intelligent Network Service of the second mobile communications network such that necessary network elements in the first mobile communications network and the second mobile communications network are configured to enable implementation of the Intelligent Network Service for the roaming subscriber, and
wherein the Intelligent Network Service is implemented entirely in the first mobile communications network when the subscriber is roaming in the second mobile communications network and when the second mobile communications network is not configured to implement the Intelligent Network service for packet-switched service for subscribers from the first mobile communications network.

19. The system of claim 18, wherein the mobile communications network includes a service control function module for controlling implementation of the Intelligent Network Service, and wherein the interface module is operative to exchange one or more packets with the service control function module to implement the Intelligent Network Service for the session.

20. The system of claim 19, wherein the interface module is further operative to transmit a packet from the interface module to the service control function module in response to an event associated with the session.

21. The system of claim 19, wherein the service control function module is operative to implement the Intelligent Network Service for circuit-switched voice services in accordance with at least one of Phase Two and Phase Three of Customized Applications for Mobile network Enhanced Logic, and
wherein the interface module is operative to convert circuit-based parameters to packet-based parameters to implement the Intelligent Network Service.

22. The system of claim 18, wherein the Intelligent Network Service is prepaid charging.

23. The system of claim 22, wherein the prepaid charging is real-time prepaid charging.

24. The system of claim 18, further comprising:
a subscriber information register that has an entry storing subscriber information for the subscriber to the first mobile communications network, wherein the entry to be accessed in response to the subscriber attaching to the first mobile communications network or another mobile communications network, and wherein the entry is defined such that if the subscriber roams into a second mobile communications network and initiates a session with a node located on the packet data network, the session will be established using the interface module.

25. The system of claim 18, wherein the interface module is operative to meter a number of information units exchanged between the subscriber of the first mobile communications network and another party during the session.

26. The system of claim 18, wherein the interface module is operative to convert circuit-based parameters to packet-based parameters to implement the Intelligent Network Service.

27. The system of claim 26, wherein the interface module is further operative to convert an amount of time to a count.

28. The system of claim 18, wherein the first mobile communications network comprises a General Packet Radio Service network or a Universal Mobile Telecommunications System network, and the interface module is operative to implement a Gi interface between the first mobile communications network and the packet data network.

29. The system of claim 18, wherein the first mobile communications network comprises a General Packet Radio Service network or a Universal Mobile Telecommunications System network, and wherein the interface node comprises at least part of a Gateway General Packet Radio Service Support Function module.

30. The system of claim 18, wherein the first mobile communications network comprises a Code-Division Multiple Access network and the interface module is at least part of a Packet Data Serving Node.

31. The system of claim 18, wherein the first mobile communications network is a home network for the subscriber and wherein the interface module implementing the Intelligent Network Service is provided in the home network.

32. The system of claim 18, wherein the Intelligent Network Service provides a data service in the packet data network.

33. The system of claim 18, wherein, if the subscriber roams into the second mobile communications network and requests a PDP session with the node of the packet data network, the PDP session is established using only the interface module of the first mobile communications network.

34. The system of claim 18, wherein the Intelligent Network Service is implemented only in the interface module of the first mobile communications network.

35. A system for implementing an Intelligent Network Service for a packet-switched service on a first mobile communications network, the system comprising:
an interface module that serves as an interface for communicating packets between the first mobile communications network and a packet data network external to the first mobile communications network; and
means for implementing the Intelligent Network Service for a session between a subscriber to the first mobile communications network and a node located on the packet data network,
wherein, when the subscriber roams into a second mobile communications network, the Intelligent Network Service is implemented in the first mobile communications network without coordinating with the Intelligent Network Service of the second mobile communications network such that necessary network elements in the first mobile communications network and the second mobile communications network are configured to enable implementation of the Intelligent Network Service for the roaming subscriber, and
wherein the Intelligent Network Service is implemented entirely in the first mobile communications network when the subscriber is roaming in the second mobile communications network and when the second mobile communications network is not configured to implement the Intelligent Network service for packet-switched service for subscribers from the first mobile communications network.

36. The system of claim 35, wherein the mobile communications network includes a service control function module for controlling implementation of the Intelligent Network Service, and wherein the system further comprises:
means for exchanging one or more packets between the interface module and the service control function module to implement the Intelligent Network Service for the session.

37. The system of claim 36, wherein the interface module comprises:
means for transmitting a packet from the interface module to the service control function module in response to an event associated with the session.

38. The system of claim 36, wherein the service control function module is operative to implement the Intelligent Network Service for circuit-switched voice services in accordance with at least one of Phase One and Phase Two of Customized Applications for Mobile network Enhanced Logic for circuit-switched voice services, and wherein the interface module comprises means for implementing the Intelligent Network Service for packet-switched services in accordance with Phase Three of Customized Applications for Mobile network Enhanced Logic.

39. The system of claim 35, wherein the Intelligent Network Service is prepaid charging.

40. The system of claim 39, wherein the prepaid charging is real-time prepaid charging.

41. The system of claim 35, further comprising:
a subscriber information register that includes an entry storing subscriber information for the subscriber to the first mobile communications network, wherein the entry to be accessed in response to the subscriber attaching to the first mobile communications network or another mobile communications network, and wherein the entry is defined such that, if the subscriber roams into a second mobile communications network and initiates a session with a node located on the packet data network, the session will be established using the interface module.

42. The system of claim 35, wherein the interface module comprises:
means for metering a number of information units exchanged between the subscriber of the first mobile communications network and another party during the session.

43. The system of claim 35, wherein the interface module comprises means for converting circuit-based parameters to packet-based parameters to implement the Intelligent Network Service.

44. The system of claim 43, wherein the means for converting the circuit-based parameters comprises:
means for converting an amount of time to a count.

45. The system of claim 35, wherein the first mobile communications network comprises a General Packet Radio Service network or a Universal Mobile Telecommunications System network, and the interface module is operative to implement a Gi interface between the first mobile communications network and the packet data network.

46. The system of claim 35, wherein the first mobile communications network comprises a General Packet Radio Service network or a Universal Mobile Telecommunications System network, and wherein the interface module comprises at least part of a Gateway General Packet Radio Service Support Function module.

47. The system of claim 35, wherein the first mobile communications network comprises a Code-Division Multiple Access network and the interface module is at least part of a Packet Data Serving Node.

48. The system of claim 35, wherein the first mobile communications network is a home network for the subscriber and wherein the interface module implementing the Intelligent Network Service is provided in the home network.

49. The system of claim 35, wherein the Intelligent Network Service provides a data service in the packet data network.

50. The system of claim 35, wherein, if the subscriber roams into the second mobile communications network and requests a PDP session with the node of the packet data network, the PDP session is established using only the interface module of the first mobile communications network.

51. The system of claim 35, wherein the Intelligent Network Service is implemented only in the interface module of the first mobile communications network.

52. A computer-readable medium having embodied thereon computer executable codes, which when executed by a computer, cause the computer to execute a method of implementing an Intelligent Network Service for a packet-switched service on a first mobile communications network having an interface module that serves as an interface for communicating packets between the first mobile communications network and a packet data network external to the first mobile communications network, the process comprising an act of:

(A) implementing the Intelligent Network Service on the interface module for a session between a subscriber to the first mobile communications network and a node located on the packet data network, wherein, when the subscriber roams into a second mobile communications network, the Intelligent Network Service is implemented in the first mobile communications network without coordinating with the Intelligent Network Service of the second mobile communications network such that necessary network elements in the first mobile communications network and the second mobile communications network are configured to enable implementation of the Intelligent Network Service for the roaming subscriber, and wherein the Intelligent Network Service is implemented entirely in the first mobile communications network when the subscriber is roaming in the second mobile communications network and when the second mobile communications network is not configured to implement the Intelligent Network service for packet-switched service for subscribers from the first mobile communications network.

53. The computer-readable medium of claim 52, wherein the mobile communications network includes a service control function module for controlling implementation of the Intelligent Network Service, and wherein act (A) further comprises:

exchanging one or more packets between the interface module and the service control function module to implement the Intelligent Network Service for the session.

54. The computer-readable medium of claim 53, wherein act (A) comprises:

transmitting a packet from the interface module to the service control function module in response to an event associated with the session.

55. The computer-readable medium of claim 53, wherein the service control function module is configured to implement the Intelligent Network Service for circuit-switched voice services in accordance with at least one of Phase One and Phase Two of Customized Applications for Mobile network Enhanced Logic, wherein the process further comprises an act of:

(B) implementing the Intelligent Network Service for packet-switched services on the interface module in accordance with Phase Three of Customized Applications for Mobile network Enhanced Logic.

56. The computer-readable medium of claim 52, wherein the Intelligent Network Service is prepaid charging.

57. The computer-readable medium of claim 56, wherein the prepaid charging is real-time prepaid charging.

58. The computer-readable medium of claim 52, wherein the first mobile communications network further comprises a subscriber information register that includes an entry storing subscriber information for the subscriber to the first mobile communications network, wherein the entry to be accessed in response to the subscriber attaching to the first mobile communications network or another mobile communications network, and wherein the process further comprises an act of:

(B) defining the entry such that if the subscriber roams into a second mobile communications network and initiates a session with a node located on the packet data network, the session will be established using the interface module of the first mobile communications network.

59. The computer-readable medium of claim 52, wherein the process further comprises an act of:

(B) metering at the interface module a number of information units exchanged between the subscriber of the first mobile communications network and a location of another party during the session.

60. The computer-readable medium of claim 52, wherein the process further comprises:

(B) converting, at the interface module, circuit-based parameters to packet-based parameters to implement the Intelligent Network Service.

61. The computer-readable medium of claim 60, wherein act (B) comprises:

converting an amount of time to a count.

62. The computer-readable medium of claim 52, wherein the first mobile communications network comprises a General Packet Radio Service network or a Universal Mobile Telecommunications System network, and the interface module is operative to implement a Gi interface between the first mobile communications network and the packet data network.

63. The computer-readable medium of claim 52, wherein the first mobile communications network comprises General Packet Radio Service network or a Universal Mobile Telecommunications System network, and the interface node comprises at least a part of a Gateway General Packet Radio Service Support Function module of the General Packet Radio Service network.

64. The computer-readable medium of claim 52, wherein the first mobile communications network comprises a Code-Division Multiple Access network and the interface module is at least as part of a Packet Data Serving Node.

65. The computer-readable medium of claim 52, wherein the first mobile communications network is a home network for the subscriber and wherein the interface module implementing the Intelligent Network Service is provided in the home network.

66. The computer program product computer-readable medium of claim 52, wherein the Intelligent Network Service provides a data service in the packet data network.

67. The computer-readable medium of claim 52, wherein, if the subscriber roams into the second mobile communications network and requests a PDP session with the node of the packet data network, the PDP session is established using only the interface module of the first mobile communications network.

68. The computer-readable medium of claim 52, wherein the Intelligent Network Service is implemented only in the interface module of the first mobile communications network.

* * * * *

UNITED STATES PATENT AND TRADEMARK OFFICE
CERTIFICATE OF CORRECTION

PATENT NO.      : 7,609,682 B2                                          Page 1 of 1
APPLICATION NO. : 10/161210
DATED           : October 27, 2009
INVENTOR(S)     : Ang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1184 days.

Signed and Sealed this

Twelfth Day of October, 2010

David J. Kappos
*Director of the United States Patent and Trademark Office*